United States Patent [19]

Ishizawa et al.

[11] Patent Number: 5,781,666
[45] Date of Patent: Jul. 14, 1998

[54] IMAGE PROCESSING METHOD AND APPARATUS SUITABLE FOR BOTH HIGH-RESOLUTION AND LOW-RESOLUTION IMAGE DATA

[75] Inventors: Yasuhisa Ishizawa, Yokohama; Yoshitsugu Yamanashi, Kawasaki; Hiroshi Nonoshita, Fujisawa; Kenjiro Chyo, Tokyo, all of Japan

[73] Assignee: Canon Kabushiki Kaisha, Tokyo, Japan

[21] Appl. No.: 380,940

[22] Filed: Jan. 31, 1995

Related U.S. Application Data

[63] Continuation of Ser. No. 87,552, Jul. 8, 1993, abandoned, which is a continuation of Ser. No. 686,170, Apr. 16, 1991, abandoned.

[30] Foreign Application Priority Data

| Apr. 17, 1990 | [JP] | Japan | 2-101218 |
| Apr. 17, 1990 | [JP] | Japan | 2-101219 |
| Apr. 17, 1990 | [JP] | Japan | 2-101220 |
| May 8, 1990 | [JP] | Japan | 2-116966 |
| May 8, 1990 | [JP] | Japan | 2-116967 |

[51] Int. Cl.$^6$ ............................................. G06K 9/00
[52] U.S. Cl. ............................................. 382/284; 382/299
[58] Field of Search ............................ 358/450, 451, 358/452, 453, 528, 537, 538, 540; 395/102, 128, 117, 135; 382/162, 254, 276, 299, 284; 345/144; H04N 1/40, 1/46

[56] References Cited

U.S. PATENT DOCUMENTS

| 4,266,249 | 5/1981 | Chai et al. | 358/260 |
| 4,675,908 | 6/1987 | Saito et al. | 382/41 |
| 4,734,786 | 3/1988 | Minakawa et al. | 358/287 |
| 4,754,488 | 6/1988 | Lyke | 382/22 |
| 4,888,812 | 12/1989 | Dinan et al. | 382/7 |
| 4,924,521 | 5/1990 | Dinan et al. | 382/54 |
| 4,942,479 | 7/1990 | Kanno | 358/448 |
| 5,028,992 | 7/1991 | Arai | 358/75 |
| 5,122,873 | 6/1992 | Golin | 358/133 |
| 5,142,616 | 8/1992 | Kellas et al. | 395/135 |
| 5,153,936 | 10/1992 | Morris et al. | 395/128 |
| 5,172,423 | 12/1992 | France | 382/22 |
| 5,239,625 | 8/1993 | Bogart et al. | 395/128 |

FOREIGN PATENT DOCUMENTS

3631329 3/1988 Germany ................. G09G 1/02

*Primary Examiner*—Andrew Johns
*Attorney, Agent, or Firm*—Fitzpatrick, Cella, Harper & Scinto

[57] ABSTRACT

An image processing apparatus makes it possible to efficiently use memories, and to output an image having a high picture quality and a high resolution. The apparatus also makes it possible to reproduce particularly edge portions of an image having a relatively low resolution wherein a plurality of bits are allocated per picture element, with a high resolution. The apparatus further makes it possible to reproduce an image having a high resolution represented by one bit per picture element as an image represented by a plurality of bits per picture element. The apparatus processes a color image obtained by synthesizing a photograph and another photograph, or a photograph and characters with a small memory capacity, and outputs an image having a high quality. That is, the apparatus comprises a memory for storing character/figure images having a high resolution and a small amount of information for one picture element, a memory for storing photographic images having a low resolution and a large amount of information per picture element, and a memory for storing control data for controlling the above-described two kinds of images. An image output having a high picture quality can be obtained with a small amount of information by effectively utilizing features of the above-described two kinds of images. It is thereby possible to reduce the number of devices required for storing information, and therefore to reduce cost. It is also possible to minimize deterioration in picture quality caused by reducing the amount of information.

10 Claims, 40 Drawing Sheets

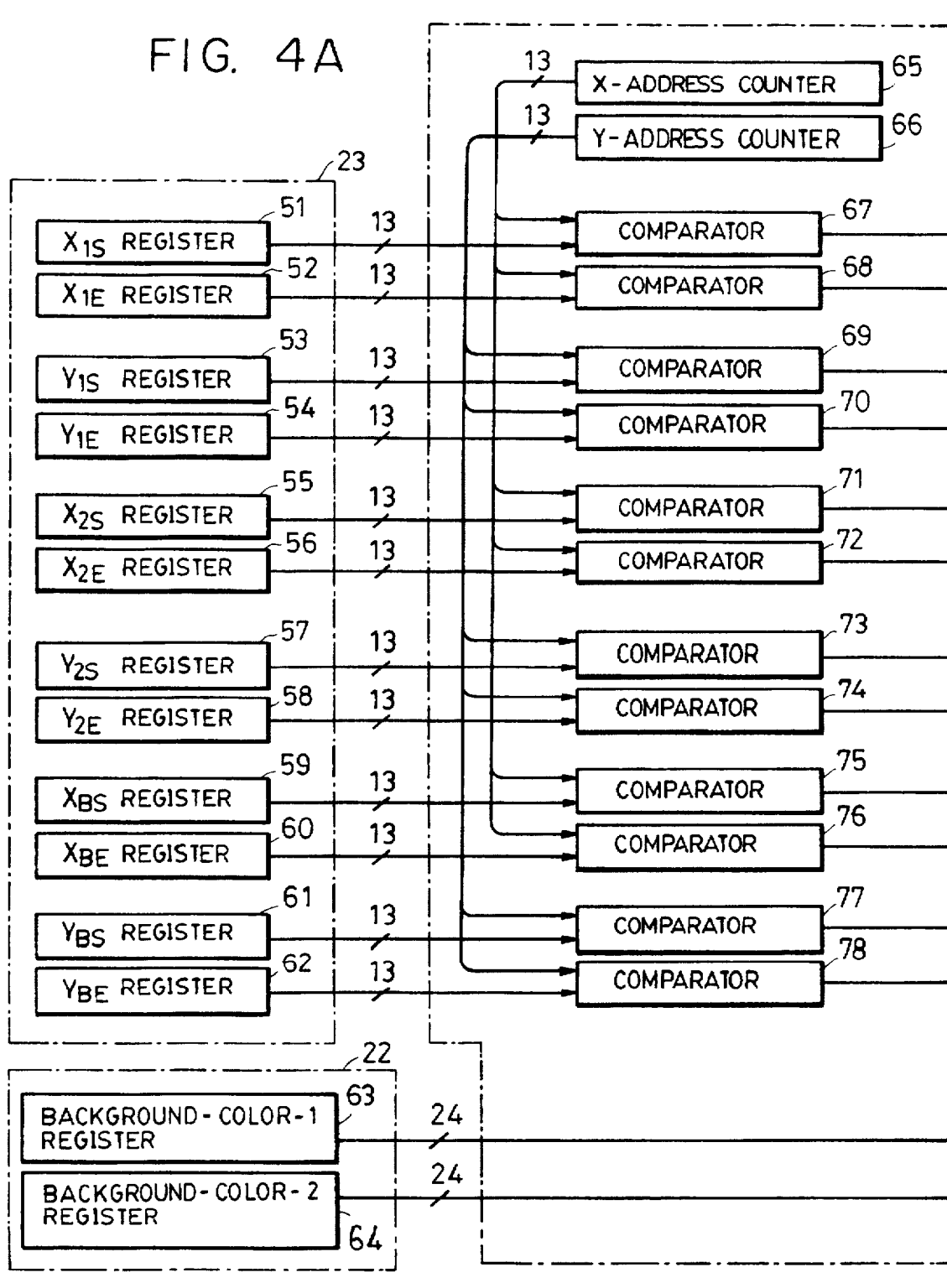

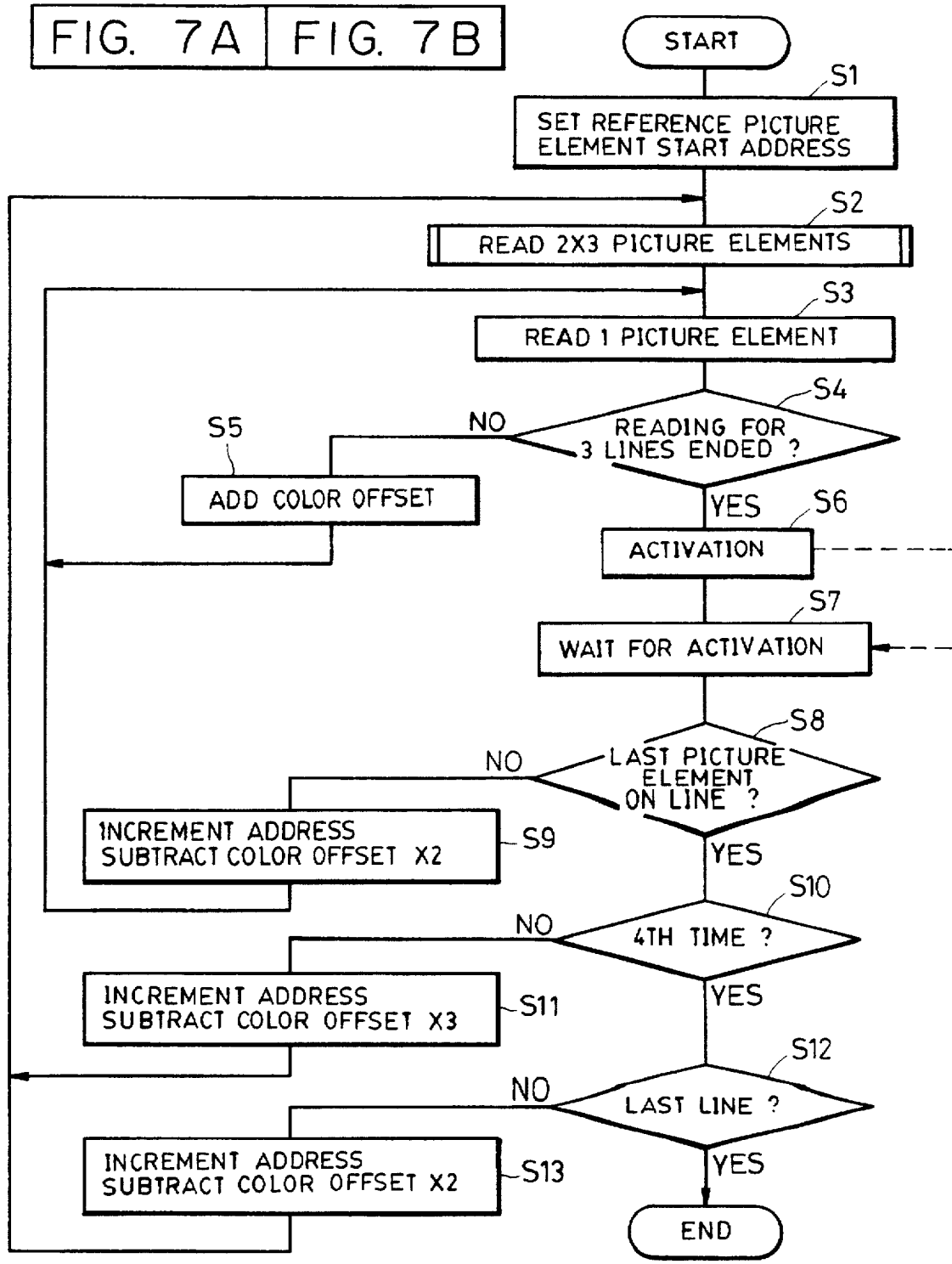

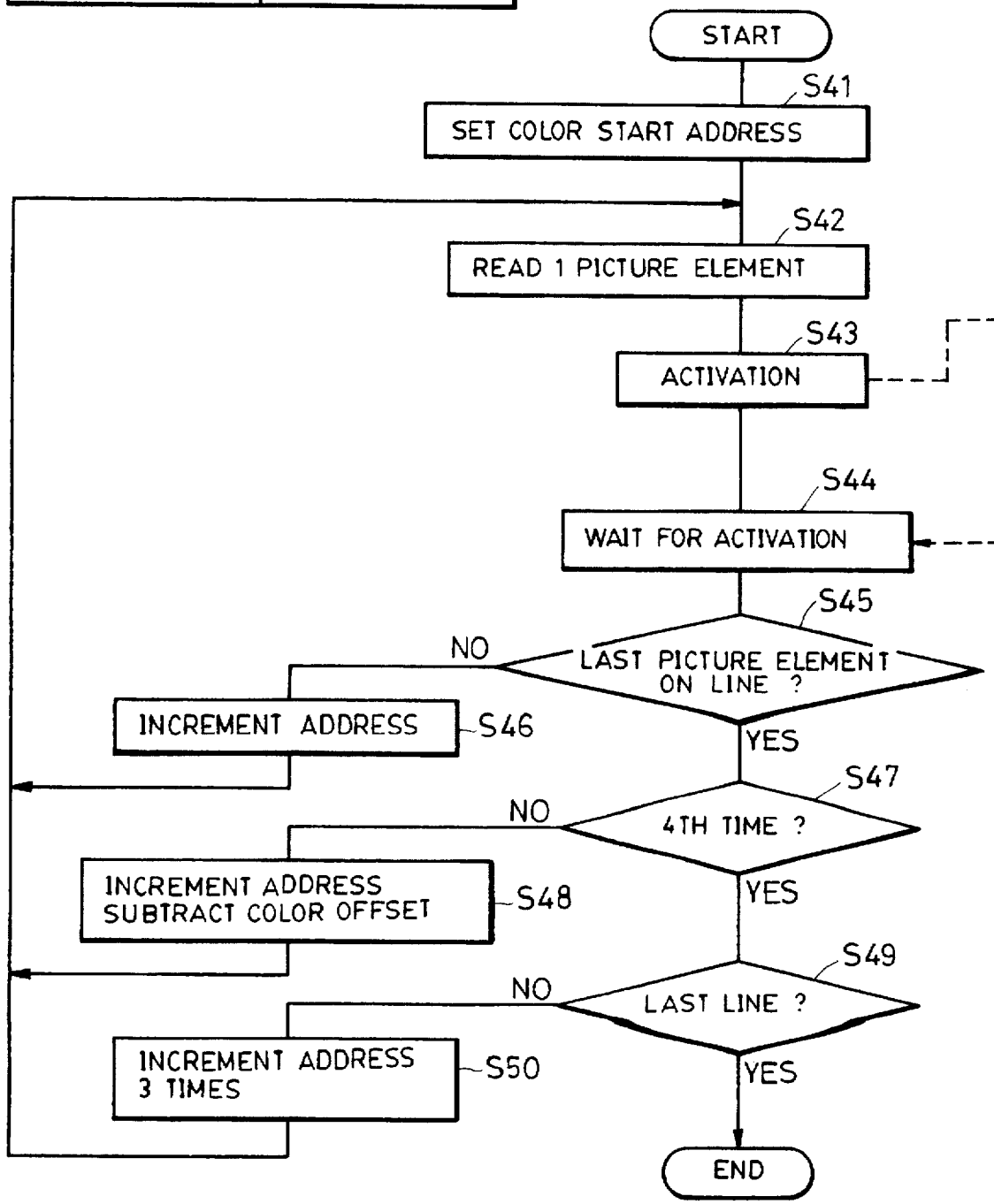

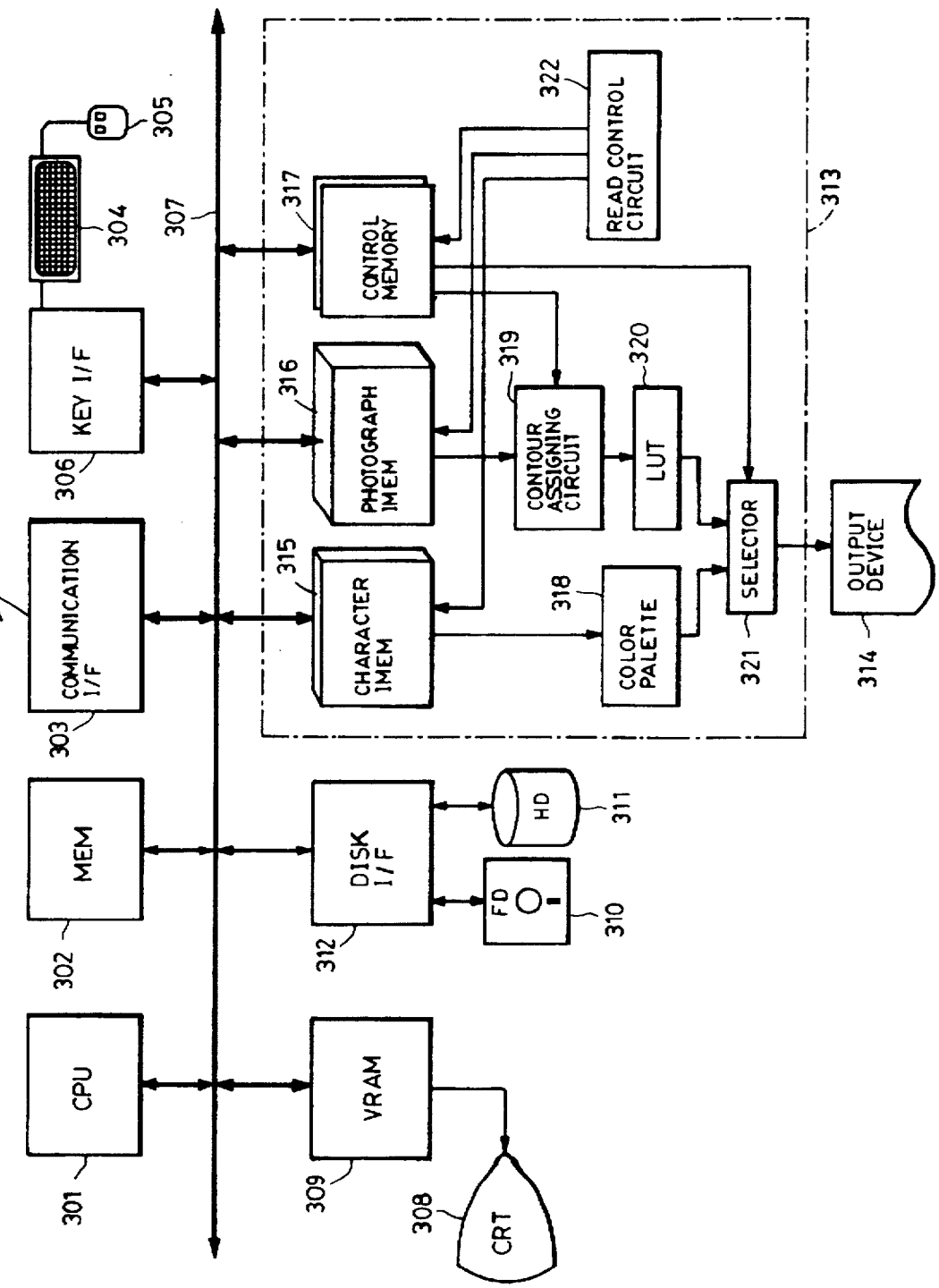

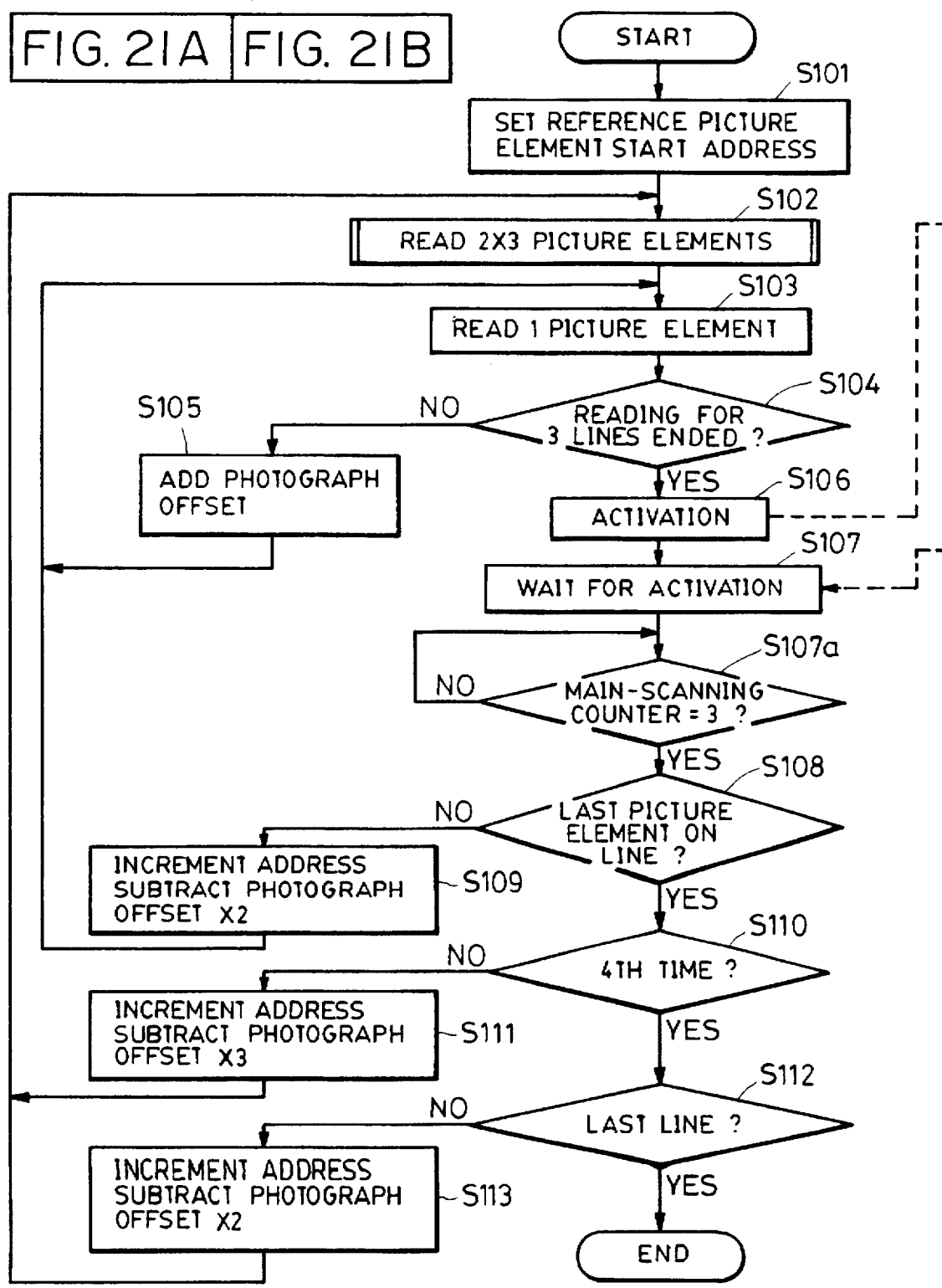

IMAGE PROCESSING METHOD AND APPARATUS SUITABLE FOR BOTH HIGH-RESOLUTION AND LOW-RESOLUTION IMAGE DATA

This application is a continuation of application Ser. No. 08/087,552 filed Jul. 8, 1993, abandoned, which is a continuation of application Ser. No. 07/686,170 filed Apr. 16, 1991, now abandoned.

BACKGROUND OF THE INVENTION

1. Field of the Invention

This invention relates to an image processing method and apparatus for forming and outputting a color image.

2. Description of the Prior Art

Heretofore, an image storage device for color images in an image processing apparatus for handling color images, particularly in a relatively inexpensive apparatus, has had a configuration as shown in FIG. 16 so as to be capable of assigning a specific area of an image to an arbitrary color. That is, the device comprises an image memory 201 which allots one bit for one picture element, an area assigning register 203, a color assigning register 202, and a color assigning circuit 204.

In a relatively expensive apparatus, an image storage device for color images is configured as shown in FIG. 17 so as to be able to use limited colors assigned by a palette over the entire area of an image. If, for example, 16 colors can be output, the device comprises an image memory 205 which allots 4 bits for each picture element, and a color palette 206 which selects 16 colors from among, for example, 4096 colors.

When handling full-colored photographic images in addition to character/figure data having limited colors assigned by a palette, an image storage device for color images is configured, for example, as shown in FIG. 27. That is, the device comprises an image memory 207 for characters, having 4 bits for each picture element, with a resolution of 400 dpi (dots per inch), an image memory 208 for photographs, having 24 bits for each picture element, with a resolution of 100 dpi, a color palette 209 for selecting 16 colors from among 16.7 million colors, a look-up table 210 for performing color-tone conversion and α conversion of a full-colored image, and a synthesizing circuit 211 for performing the simple synthesis of a character image and a photographic image.

The conventional device shown in FIG. 16, however, has the following disadvantages, since color assignment is performed in units of an area:

(1) The number of assignable areas is limited.

(2) A plurality of colors cannot be mixedly used within an area.

(3) The device cannot be used for figures and natural images.

The conventional device shown in FIG. 17 has the following disadvantages:

(1) The memory needs a large capacity (for example, in the case of A3-sized paper with a resolution of 400 dpi, 16M (mega) bytes and 32M bytes are needed for images represented 5 by 4 bits for one picture element and 8 bits for one picture element, respectively).

(2) Since limited colors are used, image quality is inferior to a natural image.

The device shown in FIG. 27 has the following disadvantages:

(1) Since the resolution of the image memory 208 for photographs is low, a case may arise wherein contour portions become stepwise notches, which are called "jags", when a photograph is synthesized with another photograph.

(2) Since the resolution of the image memory 207 for characters differs from the resolution of the image memory 208 for photographs, a poor result is obtained when characters are synthesized with a photograph.

(3) If the resolution of the image memory 208 for photographs is increased in order to solve the above-described problems (1) and (2), an extremely large capacity is needed for the memory (for example, in the case of A3-sized paper having a full-colored image represented by 8 bits for each R, G and B picture element with a resolution of 400 dpi, 96M bytes are needed).

SUMMARY OF THE INVENTION

The present invention has been made in consideration of the above-described problems.

It is an object of the present invention to provide an image processing apparatus which can efficiently output an image having a high picture quality and a high resolution with a small memory capacity.

This object is accomplished by an image processing apparatus comprising first storage means for storing an image, comprising picture element data corresponding to one bit for one picture element, with a first resolution, second storage means for storing an image, comprising picture element data corresponding to a plurality of bits for one picture element, with a second resolution which is lower than the first resolution, read control means for correspondingly reading image data from the first storage means and the second storage means, selection means for selecting the value of one picture element datum from among a group of picture element data read from the second storage means for the position of each picture element constituting a group of picture element data read from the first storage means according to a pattern of the group of picture element data read from the first storage means, background image data storage means for storing image data uniquely defining a background of image data, switching means for switching between corresponding picture element data in the second storage means and background image data stored in the background image data storage means in accordance with a state of each picture element data stored in the first storage means, area assigning information storage means for storing at least one area assigning information for defining a desired area within the image data stored within the first and second storage means, and second switching means for switching between respective image data obtained from the selection means and the switching means according to the inside or the outside of the region defined by the area assigning information stored in the area assigning information storage means.

It is a further object of the present invention to provide an image processing apparatus which can reproduce, particularly, edge portions of an image having a relatively low resolution wherein a plurality of bits are allocated for one picture element with a high resolution.

This object is accomplished by an image processing apparatus comprising first storage means for storing an image, comprising picture element data corresponding to one bit for one picture element, with a first resolution, second storage means for storing an image, comprising picture element data corresponding to a plurality of bits for one picture element, with a second resolution which is lower than the first resolution, read control means for correspondingly reading image data from the first storage means and the second storage means, and selection means for selecting the value of one picture element data from among a group of picture element data read from the second storage means for the position of each picture element constituting a group of picture element data read from the first storage means according to a pattern of the group of picture element data read from the first storage means.

It is a still further object of the present invention to provide an image processing apparatus which can reproduce a high-resolution image represented by one bit per picture element as an image corresponding to a plurality of bits per picture element.

This object is accomplished by an image processing apparatus comprising first storage means for storing an image, comprising picture element data corresponding to one bit for one picture element, with a first resolution, second storage means for storing an image, comprising picture element data corresponding to a plurality of bits for one picture element, with a second resolution which is lower than the first resolution, read control means for correspondingly reading image data from the first storage means and the second storage means, background image data storage means for storing image data uniquely defining a background of image data, and switching means for switching between corresponding picture element data stored in the second storage means and background image data stored in the background image data storage means in accordance with a state of each picture element datum stored in the first storage means.

It is still another object of the present invention to provide an image processing apparatus which removes the disadvantages in the prior art, processes a color image obtained by synthesizing a photograph and another photograph, or a photograph and characters with a small memory capacity, and outputs the image with a high quality.

This object is accomplished, according to one aspect of the present invention, by an image processing apparatus for synthesizing a halftone image and a contrast image, comprising first image storage means for storing the halftone image in multiple values having a first resolution, second image storage means for storing the contrast image in binary values having a second resolution which is higher than the first resolution, contour storage means for storing a contour between the halftone image and the contrast image, and contour forming means for forming at least contour portions in multiple values having the second resolution according to information of the contour.

According to another aspect, the present invention relates to an image processing apparatus comprising first image data storage means for storing first image data wherein one picture element is represented by a first amount of information with a first resolution, second image data storage means for storing second image data wherein one picture element is represented by a second amount of information which is greater than the first amount of information, and with a second resolution which is lower than the first resolution, control data storage means for storing first data for control and second data for control which comprise two bits per picture element with the same resolution as the first resolution and which have uses different from each other, image data read control means for correspondingly reading the first image data, the second image data and the control data, image data switching means for switching the second image data with the first resolution according to the first control data, information amount conversion means for converting the first image data represented by the first amount of information into image data represented by the second amount of information, and image data selection means for selectively outputting image data output from the image data switching means and image data output from the information amount conversion means.

The image data switching means comprises image data reading means for reading the first image data in an m×m matrix (m being an integer equal to at least 2), image data pattern determination means for determining an image data pattern of the m×m matrix, neighboring picture element reading means for reading corresponding picture elements corresponding to the m×m matrix and neighboring picture elements of the corresponding picture elements from among the second picture element data, and picture element selection means for selecting between the corresponding picture elements and the neighboring picture elements in units of one picture element of the m×m matrix according to a result of determination of the image data pattern determination means.

The value m in the m×m matrix is a value obtained by dividing the first resolution by the second resolution.

According to another aspect, the present invention relates an image processing apparatus for synthesizing a halftone image with another image, comprising image storage means for storing the halftone image in multiple values with a predetermined resolution, contour storage means for storing a contour of the halftone image during synthesis, and resolution conversion means for converting the contour of the halftone image into a resolution which is higher than the predetermined resolution.

The contour storage means stores the contour of the halftone image with the higher resolution.

According to another aspect, the present invention relates to an image processing apparatus comprising first image data storage means for storing first image data wherein one picture element is represented by a first amount of information with a first resolution, second image data storage means for storing second image data wherein one picture element is represented by a second amount of information which is greater than the first amount of information, and with a second resolution which is lower than the first resolution, control data storage means for storing data for control which comprises at least one bit per picture element with the same resolution as the first resolution, image data read control means for correspondingly reading the first image data, the second image data and the control data, and image data switching means for switching the second image data with the first resolution according to the control data.

The image data switching means comprises image data reading means for reading the first image data in an m×m matrix (m being an integer equal to at least 2), image data pattern determination means for determining an image data pattern of the m×m matrix, neighboring picture element reading means for correspondingly reading picture elements corresponding to the m×m matrix and neighboring picture elements of the corresponding picture elements from among the second picture element data, and picture element selection means for selecting between the corresponding picture elements and the neighboring picture elements in units of one picture element of the m×m matrix according to a result of determination by the image data pattern determination means.

The value m in the m×m matrix is a value obtained by dividing the first resolution by the second resolution.

BRIEF DESCRIPTION OF THE DRAWINGS

FIG. 18 is a block diagram showing the configuration of an image processing apparatus of a second embodiment of the present invention;

DESCRIPTION OF THE PREFERRED EMBODIMENTS

Embodiment 1

A first embodiment of the present invention will now be explained with reference to the attached drawings.

<Explanation of Configuration>

Figure 1:
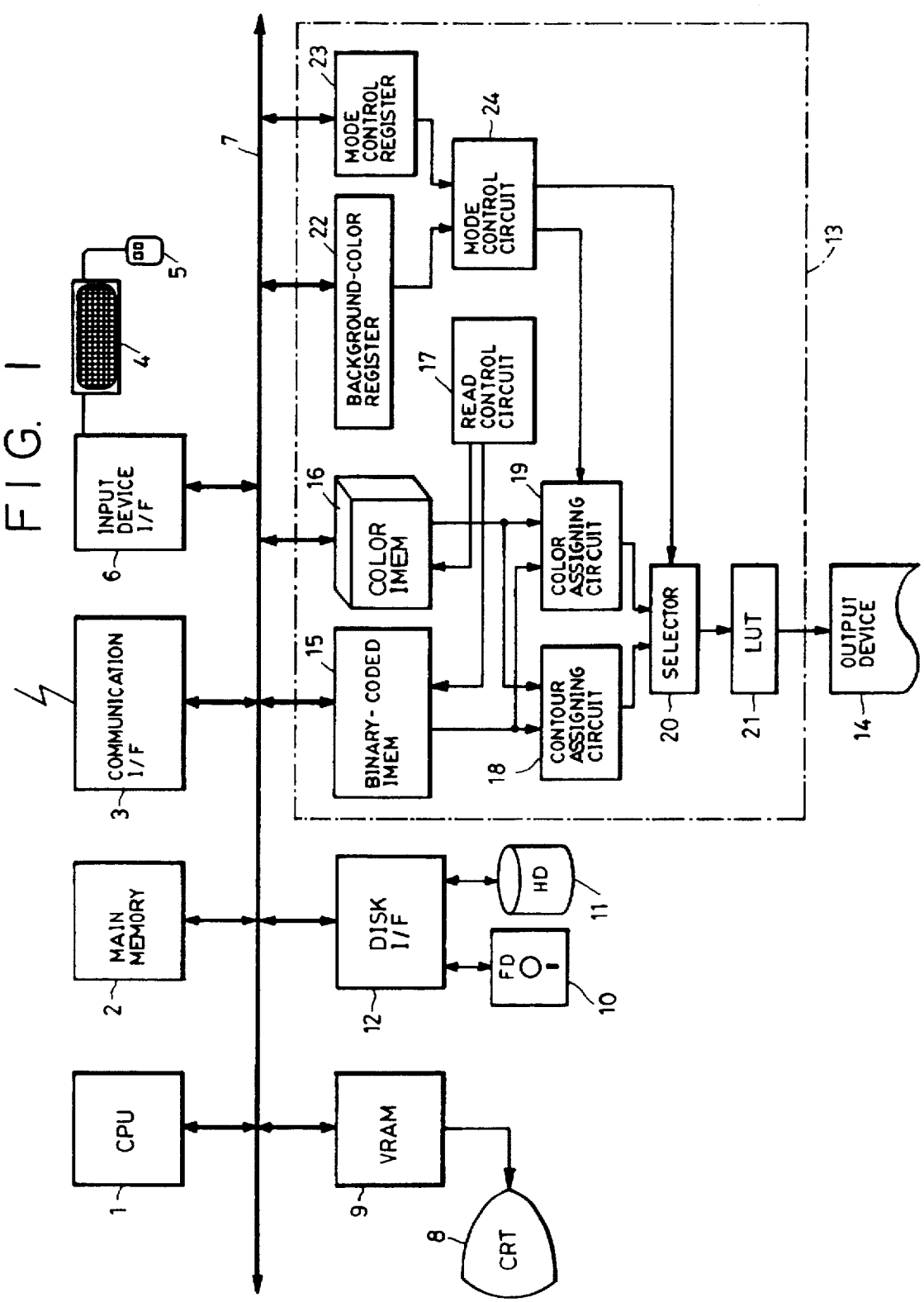
FIG. 1 is a block diagram showing the configuration of an image processing apparatus according to a first embodiment of the present invention.
Figure 2:
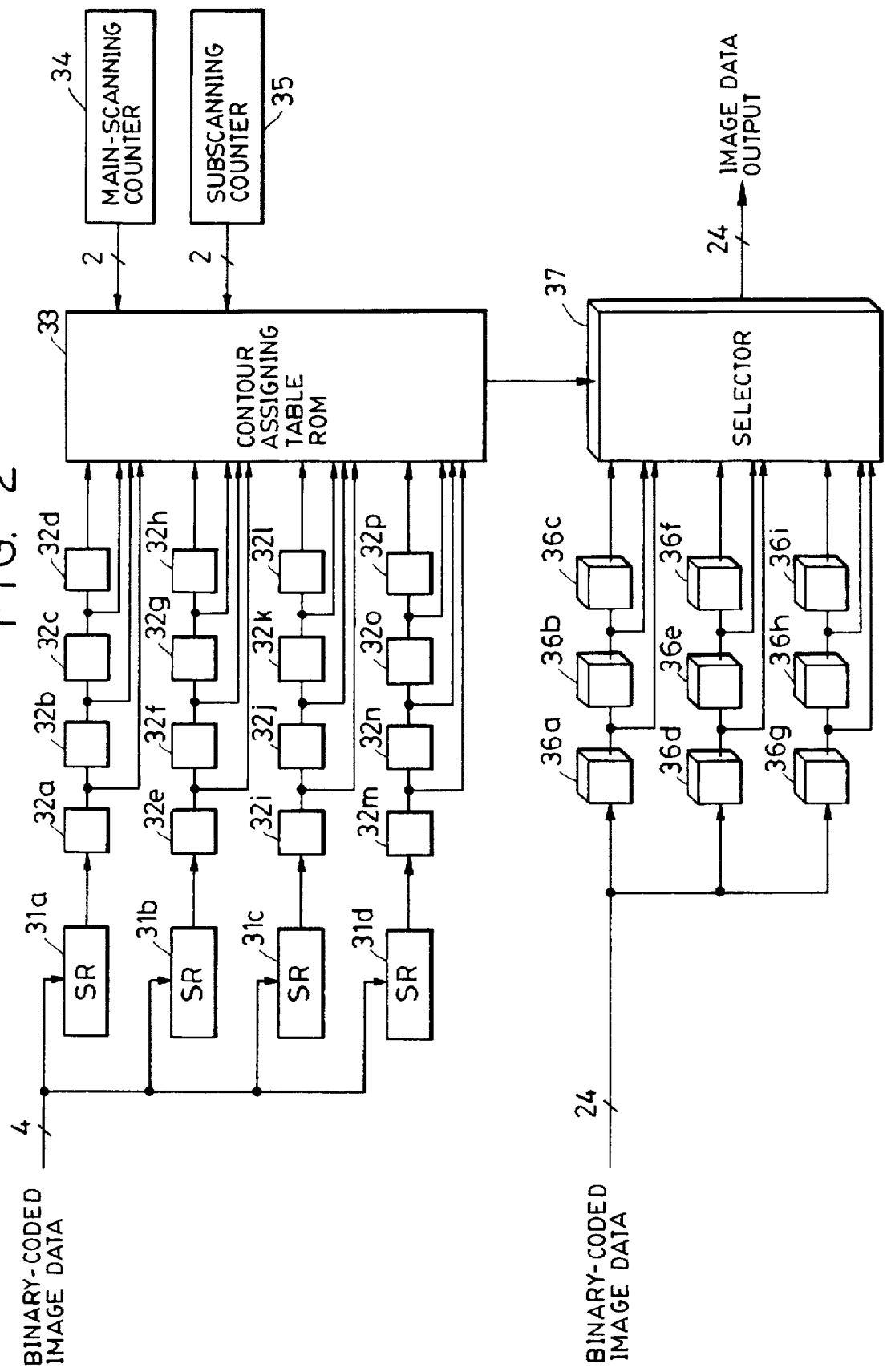
FIG. 2 is a block diagram showing the configuration of a contour assigning circuit 18 shown in FIG. 1.
Figure 3:
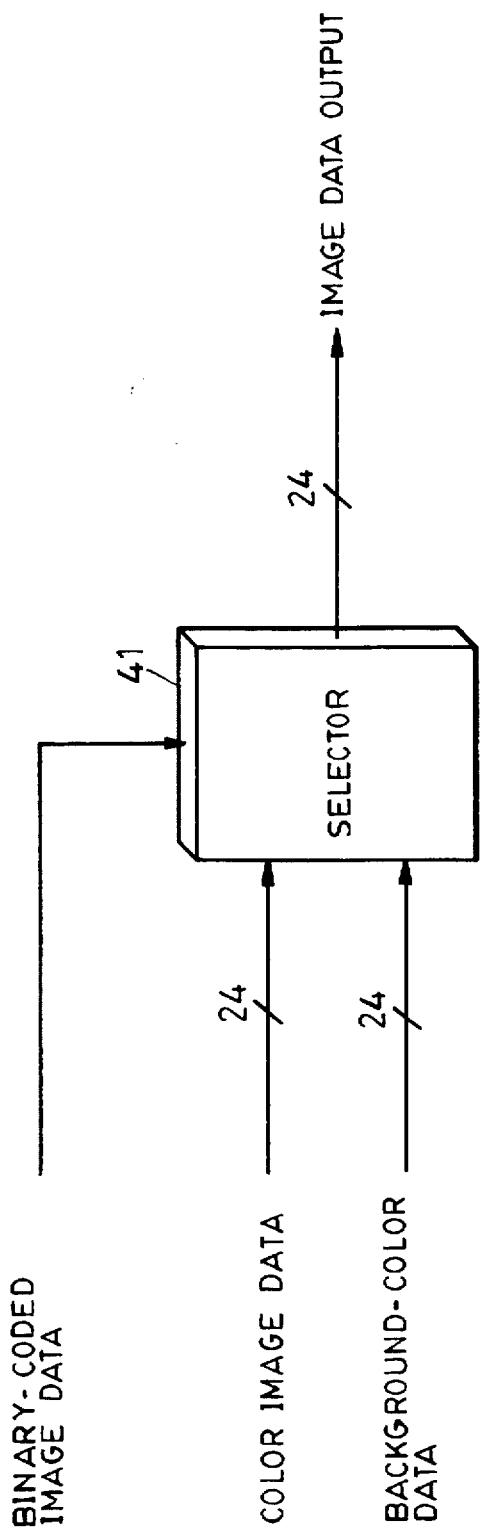
FIG. 3 is a block diagram showing the configuration of a color assigning circuit 19 shown in FIG. 1.
Figure 4B:
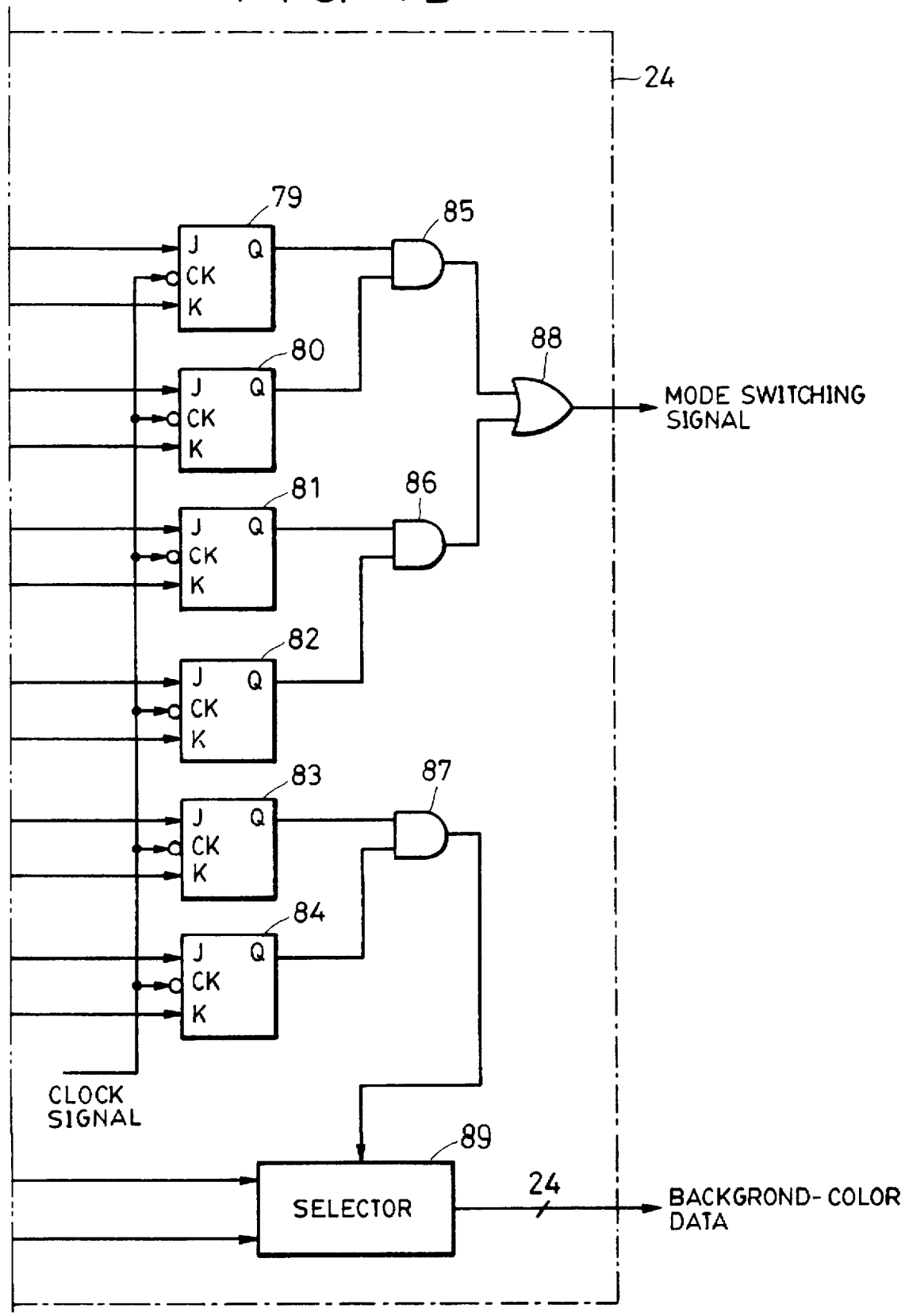
FIG. 4, composed of FIGS. 4A and 4B, is a block diagram showing the configuration of a background-color register 22, a character control register 23 and a mode control circuit 24 shown in FIG. 1.
Figure 5:
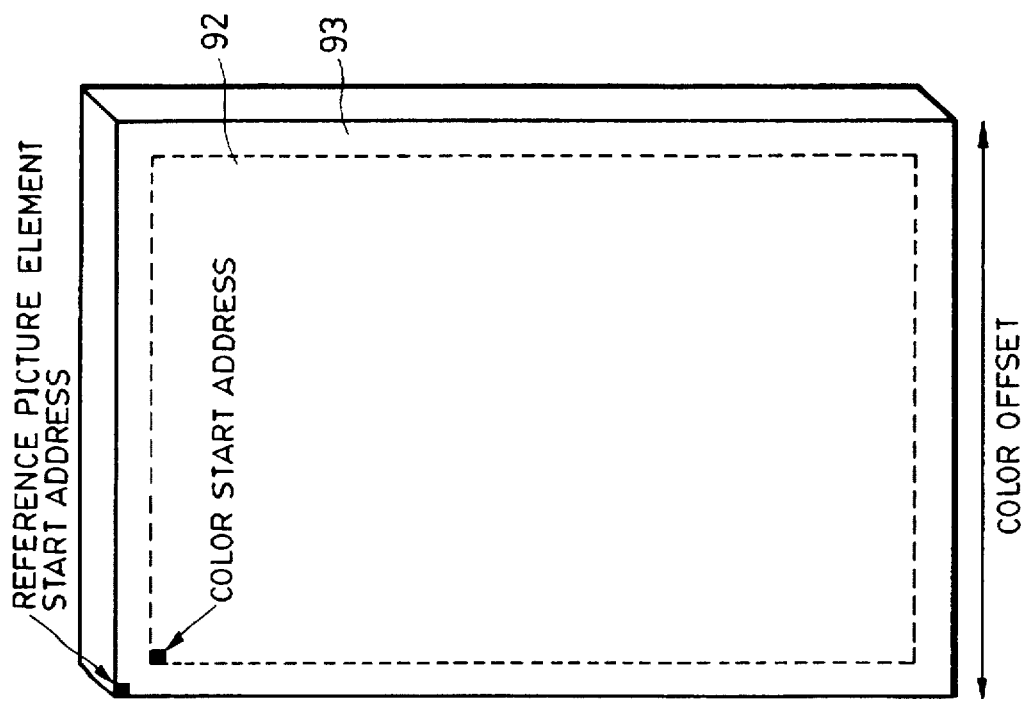
FIGS. 5(A) and 5(B) illustrate how image data are stored within a binary-coded IMEM 15 and a color IMEM 16 shown in FIG. 1, respectively.
Figure 5:
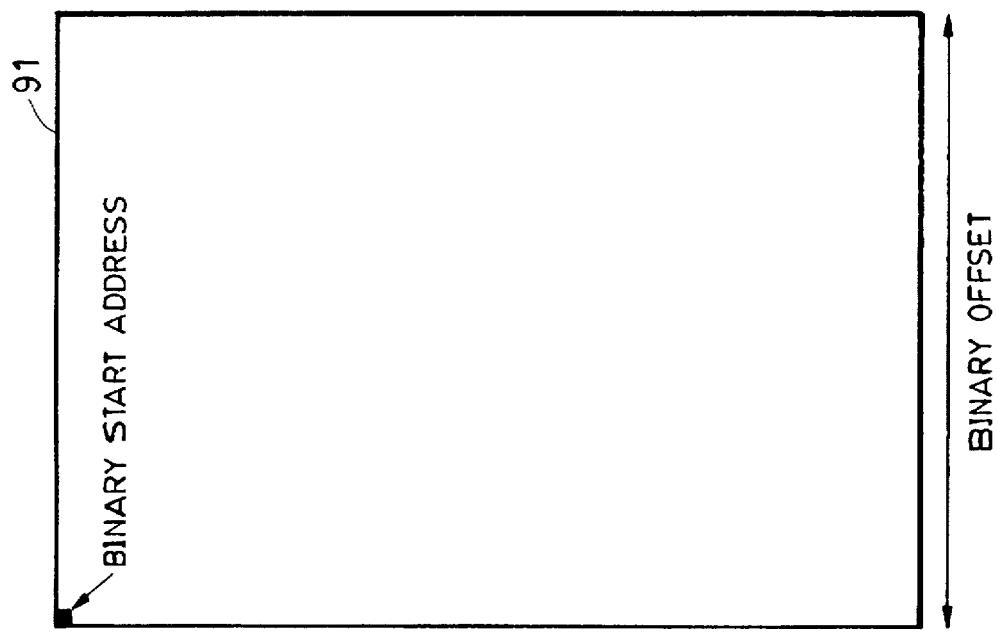

FIG. 1 is a block diagram showing the configuration of an image processing apparatus according to the first embodiment. FIGS. 2–4 illustrate details of respective parts thereof.

In FIG. 1, a CPU (central processing unit) controls the entire apparatus. A main memory 2 temporarily stores programs and the like, and is also used as work areas. A communication interface 3 (hereinafter termed a communication I/F) is connected to an LAN (local area network). A keyboard 4 is used for inputting character codes and the like. A pointing device 5 indicates the position of a cursor on a display picture surface. An input device interface 6 (hereinafter termed an input device I/F) controls input devices, such as the keyboard 4, the pointing device 5 and the like. A system bus 7 transmits address data, control signals and the like. A CRT display (hereinafter termed a CRT) serves as a display unit. A video RAM (hereinafter termed a VRAM) 9 expands an image to be displayed on the CRT 8. There are also shown a floppy disk drive (hereinafter termed an FD) 10, a hard disk drive (hereinafter termed an HD) 11, a disk interface (hereinafter termed a DISK-I/F) 12 for controlling the FD 10 and the HD 11, an image control unit 13 which is a characteristic portion of the present embodiment, and an output device 14, such as a printer or the like.

The image control unit 13 in the present embodiment comprises the following components indicated by reference numbers 15–24.

A binary-coded image memory (hereinafter termed a binary-coded IMEM) 15 stores (expands) binary-coded image data comprising one bit for one picture element and having a resolution of 400 dpi. A color image memory (hereinafter termed a color IMEM) 16 stores and expands color image data comprising 24 bits per picture element and having a resolution of 100 dpi. A read control circuit 17 correspondingly reads data from the binary-coded IMEM 15 and the color IMEM 16. A contour assigning circuit 18 performs the contour control of color image data (resolution of 100 dpi) stored in the color IMEM 16 in accordance with binary-coded image data (resolution of 400 dpi) stored in the binary-coded IMEM 15. A color assigning circuit 19 performs color assignment for binary-coded image data stored in the binary-coded IMEM 15 in accordance with color image data stored in the color IMEM 16. A selector 20 selects between data output from the contour assigning circuit 18 and data output from the color assigning circuit 19 in accordance with an indicating signal from a mode control circuit (to be described later). A look-up table (hereinafter termed a LUT) 21 performs color correction and the like.

FIG. 2 is a block diagram showing the detailed configuration of the contour assigning circuit 18 shown in FIG. 1. In FIG. 2, shift registers (hereinafter termed SRs) 31a–31d input binary-coded image data in units of 4 bits and serially output the input data. Flip-flops (hereinafter termed FFs) 32a–32p latch picture element data comprising one bit, respectively. These picture element data constitute a 4×4 picture element matrix. A contour assigning table ROM 33 stores table information for performing contour assignment in accordance with the pattern of the 4×4 picture element matrix. A main-scanning counter 34 counts the 4×4 picture element matrix in the main-scanning direction. A subscanning counter 35 counts the 4×4 picture element matrix in the subscanning direction. Each counter comprises 2 bits, and counts from "0" to "3". Flip-flops (hereinafter termed 24 bit FFs) 36a–36i latch respective data each of 24 bits. These data constitute a 3×3 picture element matrix wherein one picture element comprises 24 bits. A selector 37 selectively outputs color image data of the 3×3 picture element matrix in accordance with an assignment by the contour assigning table ROM 33.

FIG. 3 is a block diagram showing the detailed configuration of the color assigning circuit 19 shown in FIG. 1.

In FIG. 3, a selector 41 selects between color image data and background-color data in accordance with a state of binary-coded image data.

FIG. 4 is a block diagram showing the detailed configuration of the background-color register 22, the mode control register 23 and the mode control circuit 24 shown in FIG. 1.

Figure 15:
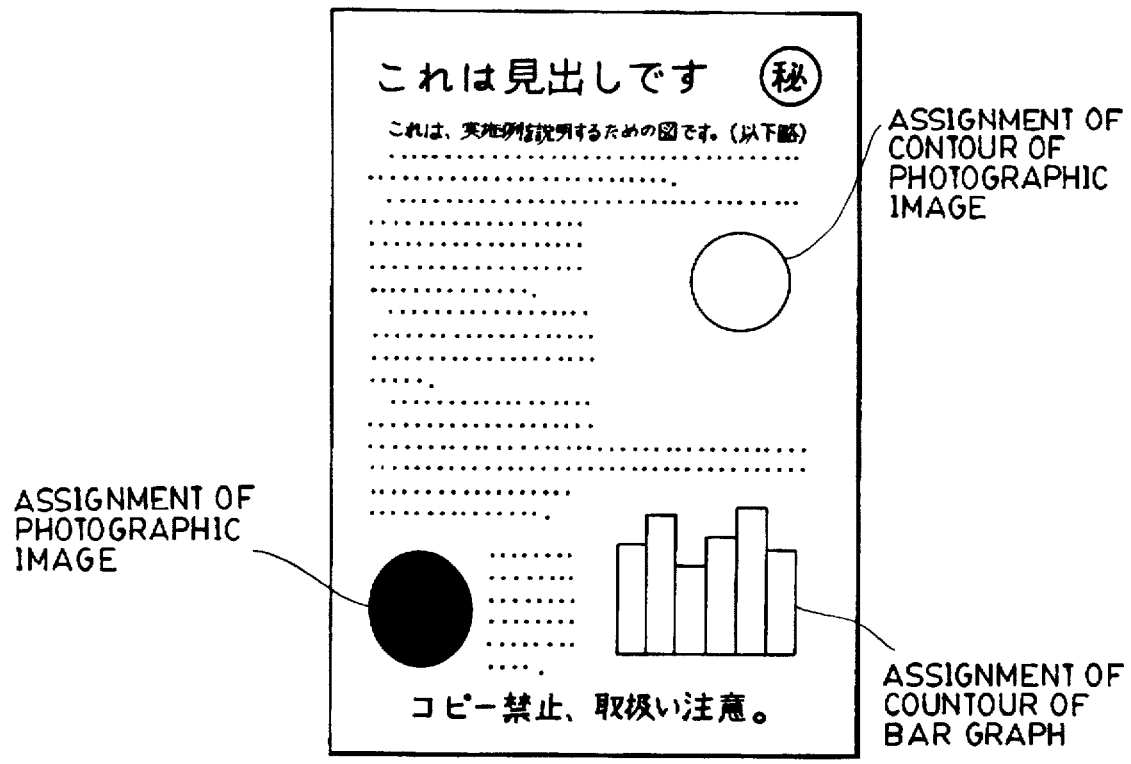
FIGS. 15(A)–15(C) show contents of setting for obtaining the example of printing output shown in FIG. 14.
Figure 15B:
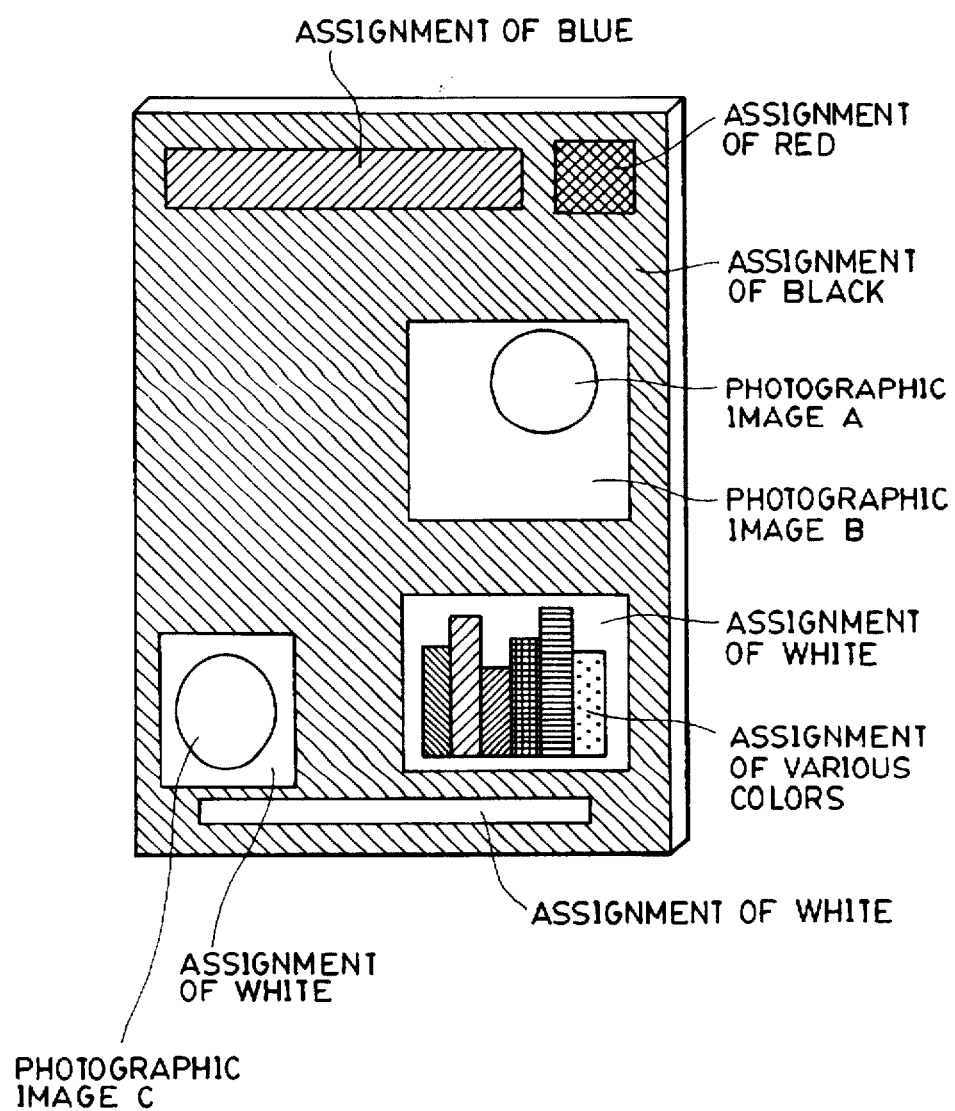
Figure 15C:
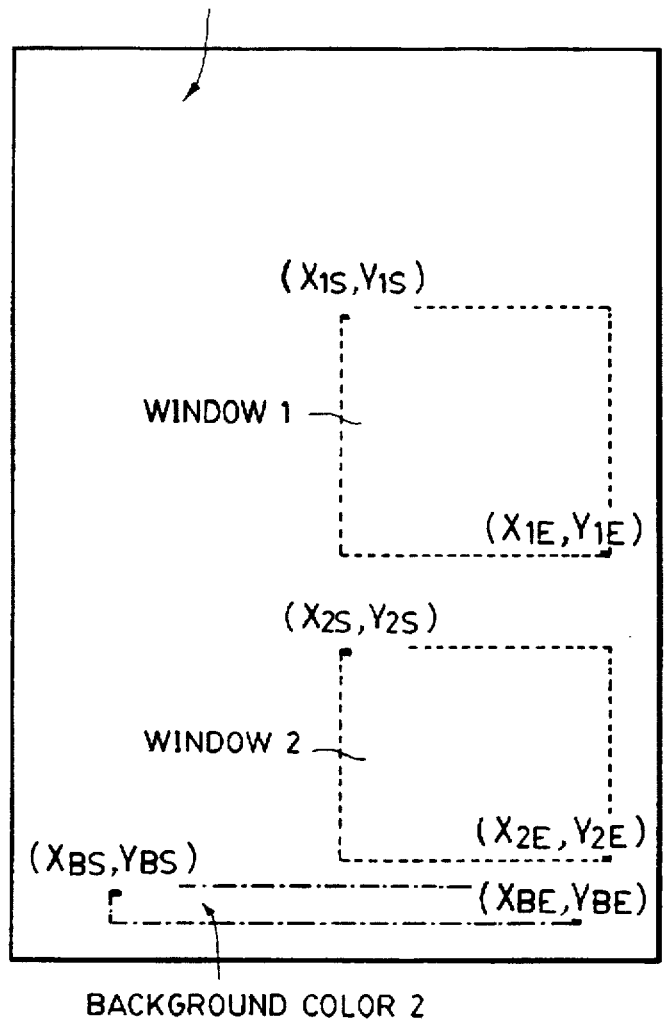
Figure 16:
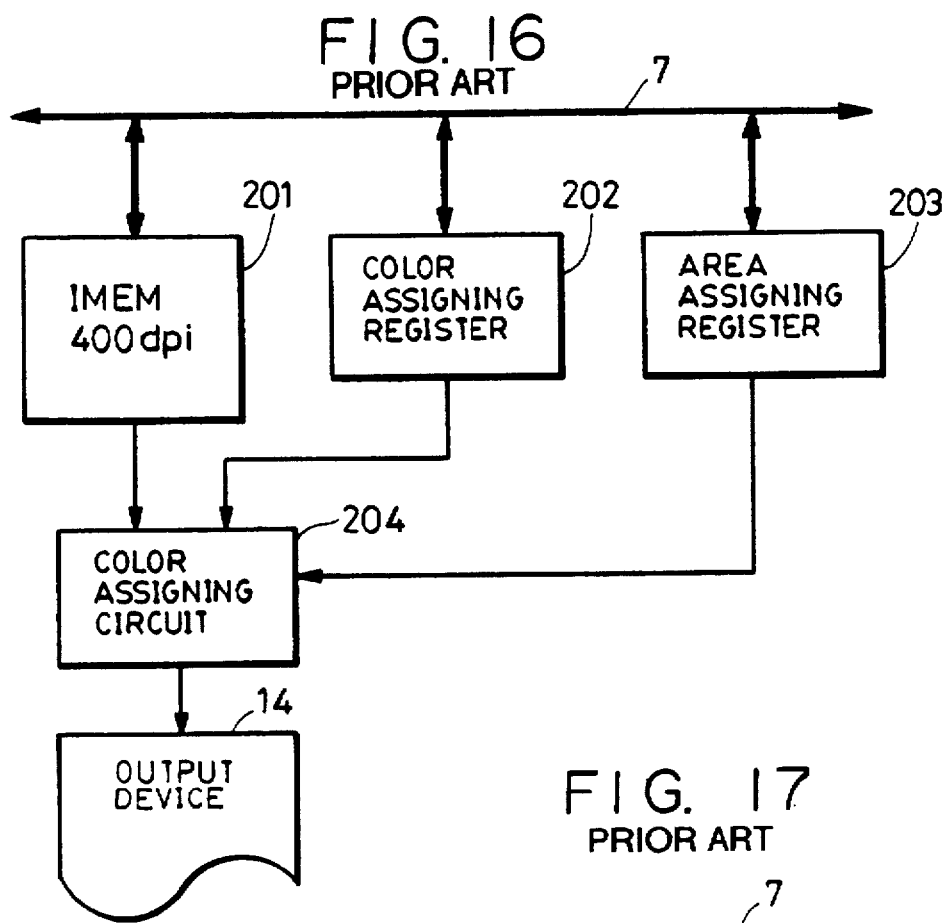
FIGS. 16 and 17 show the configurations of conventional image control units.
Figure 17:
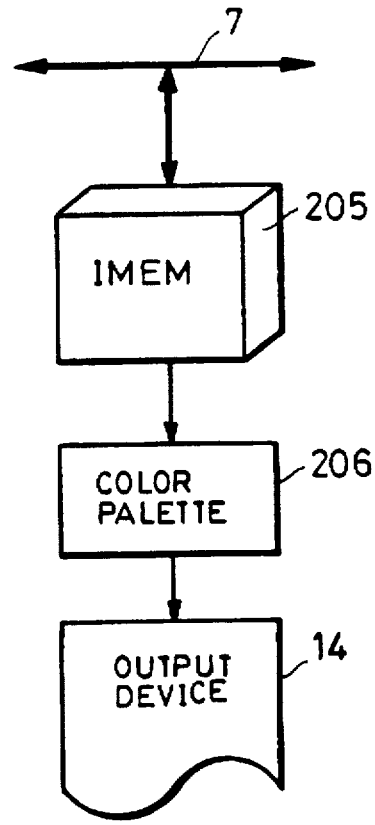

In FIG. 4, a group of registers 51–62 constitute the mode control register 23, and store address information of windows shown in FIG. 15(C). An $X_{1s}$ register 51 assigns a start address of window 1, shown in FIG. 15(C), in the X coordinate. An $X_{1E}$ register 52 indicates an end address of window 1 in the X coordinate. A $Y_{1s}$ register 53 indicates a start address of window 1 in the Y coordinate. A $Y_{1E}$ register 54 indicates an end address of window 1 in the Y coordinate. Similarly, $X_{2s}$, $X_{2E}$, $Y_{2s}$, and $Y_{2E}$ registers 55–58 assign addresses of window 2 shown in FIG. 15(C), and $X_{BS}$, $X_{BE}$, $Y_{BS}$ and $Y_{BE}$ registers 59–62 assign addresses of background-color window shown in FIG. 15(C).

Registers 63 and 64 constitute the background-color register 22. A background-color-1 register 63 stores background-color-1 data which define a background color of the entire paper. A background-color-2 register 64 stores background-color-2 data which define a background color for an area within a background-color window.

Reference numbers 65–89 represent components of the mode control circuit 24.

An X-address counter 65 counts addresses in the direction X. A Y-address counter 66 counts addresses in the direction Y. Comparators 67–78 compare outputs from the group of registers 51–62 with an output from the X-address counter 65 or the Y-address counter 66, respectively. There are also shown J-K flip-flops (hereinafter termed JK-FFs) 79–84, AND circuits (hereinafter termed ANDs) 85–87, and an OR circuit (hereinafter termed an OR) 88. A selector 89 selects between outputs from the background-color-1 register 63 and the background-color-2 register 64.

<Explanation of Operation>

An explanation will now be provided of the operation of the present embodiment configured as described above with reference to FIGS. 5(A)–15(C).

FIG. 5(A) illustrates how binary-coded image data are stored within the binary-coded IMEM 15 shown in FIG. 1. FIG. 5(B) illustrates how color image data are stored within the color IMEM 16 shown in FIG. 1.

In FIG. 5(A), binary-coded image data 91 are expanded in accordance with the size of paper for output, and are continuously stored from a binary start address within the binary-coded IMEM 15. Hence, if an address corresponding to the data length of one line in the main-scanning direction is added, the result becomes data at the same column on the next line. The addresses corresponding to the data length of one line is hereinafter termed a binary offset.

In FIG. 5(B), color image data 92 are expanded in accordance with the size of paper for output. Reference number 93 represents color image data including reference picture elements obtained by adding surrounding respective one picture elements as reference picture elements for the contour assigning circuit 18. White data are usually input as the reference picture elements. The color image data 93 including reference picture elements are continuously stored from a reference picture element start address within the color IMEM 16. Hence, if an address corresponding to the data length of one line in the main-scanning direction is added, the result becomes data at the same column on the next line. This address is hereinafter termed a color offset. Since the color image data 92 comprise portions obtained by removing surrounding respective individual picture elements from the color image data 93 including reference picture elements, the leading address of the color image data 92 is at a color start address shown in FIG. 5(B). By reading the binary-coded image data 91 and the color image data 93 from the binary start address and the color start address, respectively, in synchroniziation with each other, it is possible to correspondingly read two kinds of image data.

Figure 6A:
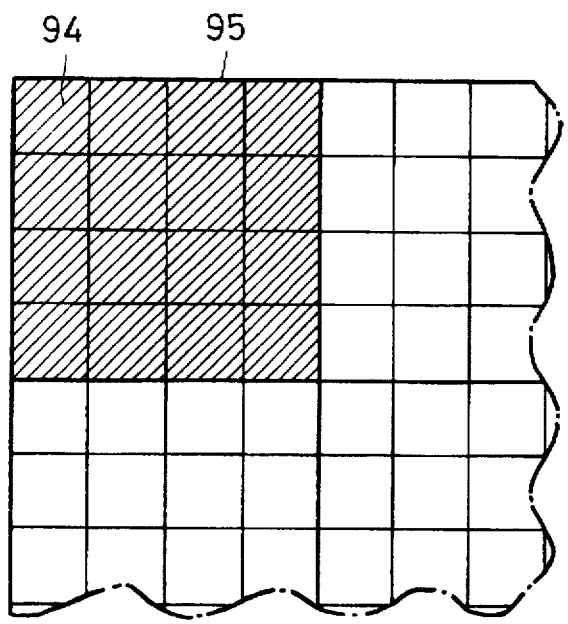
FIGS. 6(A) and 6(B) illustrate the relationship of correspondence between picture elements of binary-coded image data and color image data.
Figure 6B:
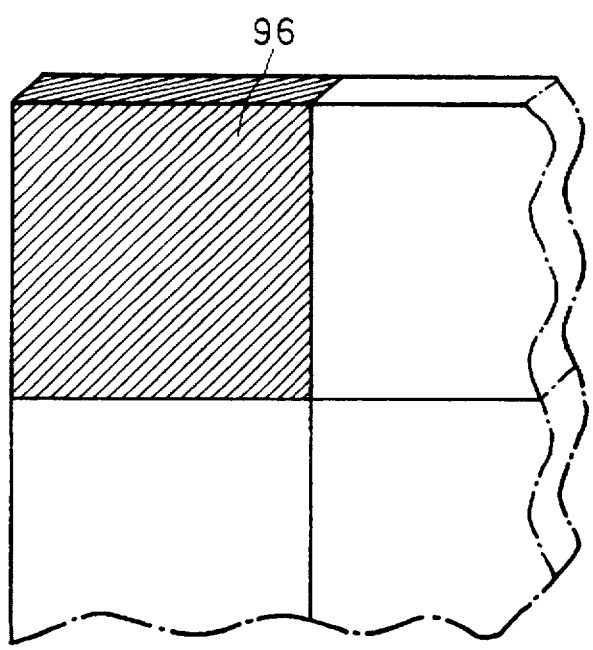

FIGS. 6(A) and 6(B) illustrate the relationship of correspondence between picture elements of binary-coded image data within the binary-coded IMEM 15 and color image data within the color IMEM 16.

In FIG. 6(A), reference number 94 represents one picture element of binary-coded image data (of a resolution of 400 dpi), and reference number 95 represents a 4×4 picture element matrix comprising such picture elements.

In FIG. 6(B), reference number 96 represents one picture element of color image data (of a resolution of 100 dpi) which corresponds to the 4×4 picture element matrix 95 shown in FIG. 6(A).

Figure 7B:
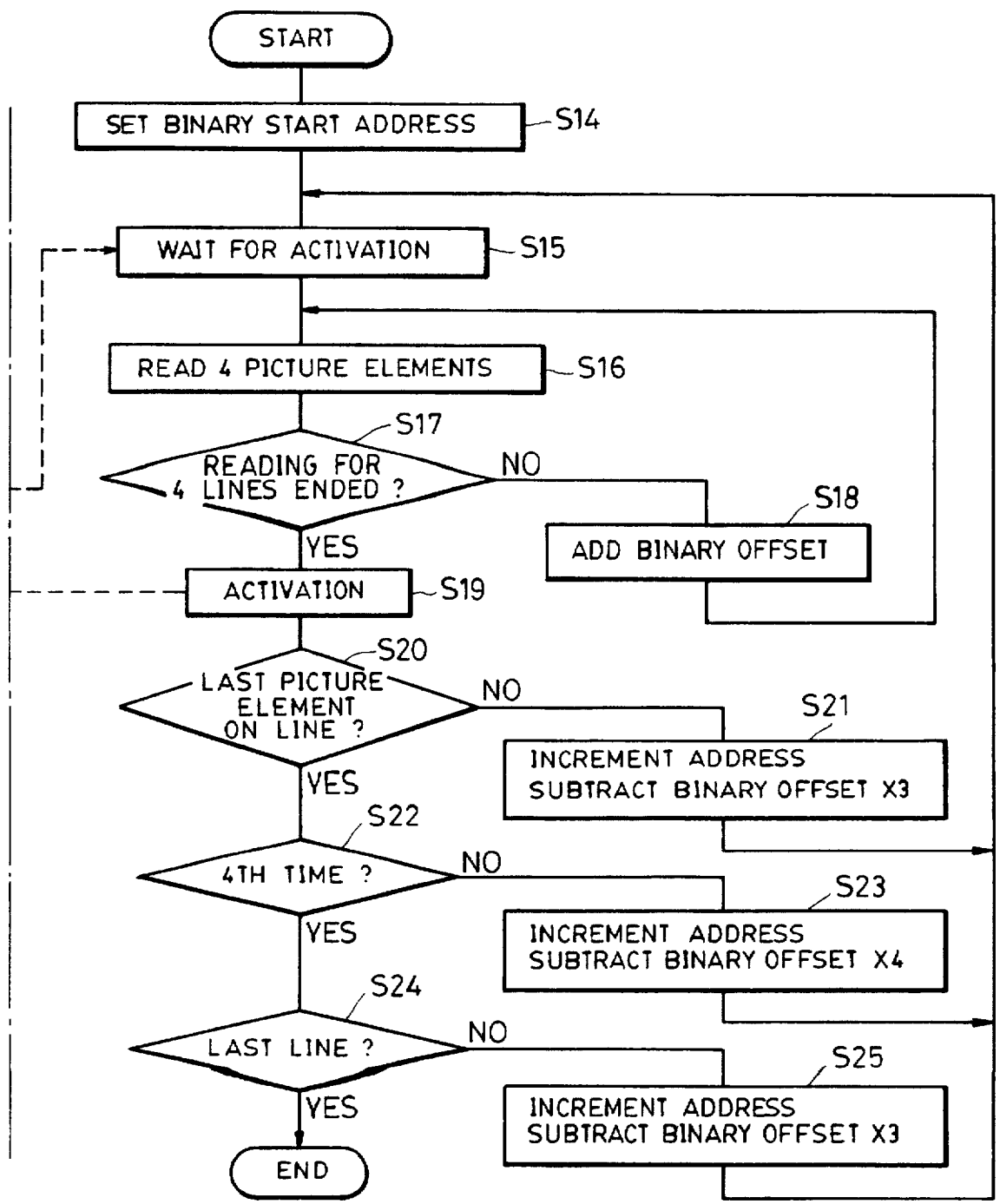
FIG. 7, composed of FIGS. 7A and 7B, and FIG. 8 are flowcharts showing reading operations for the contour assigning circuit 18.
Figure 8:
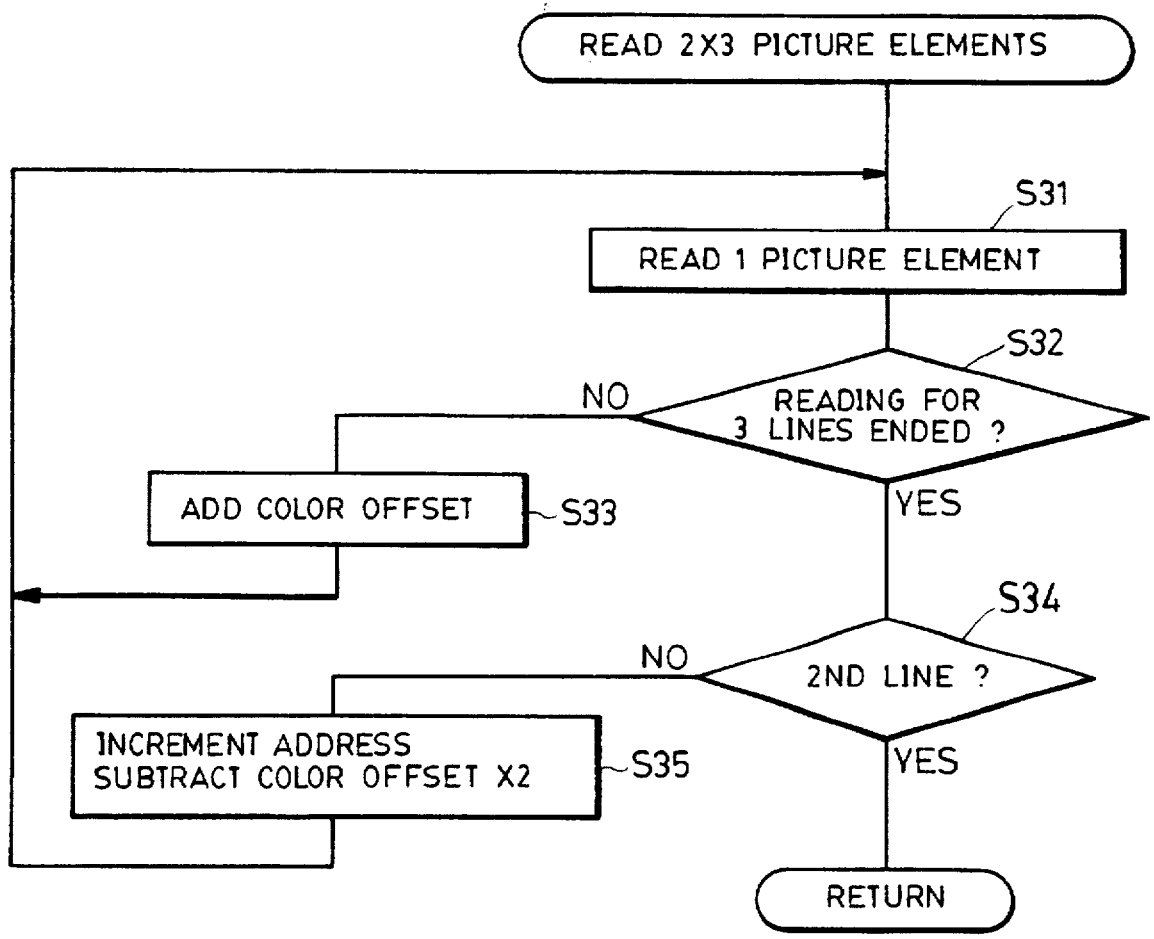
Figure 9B:
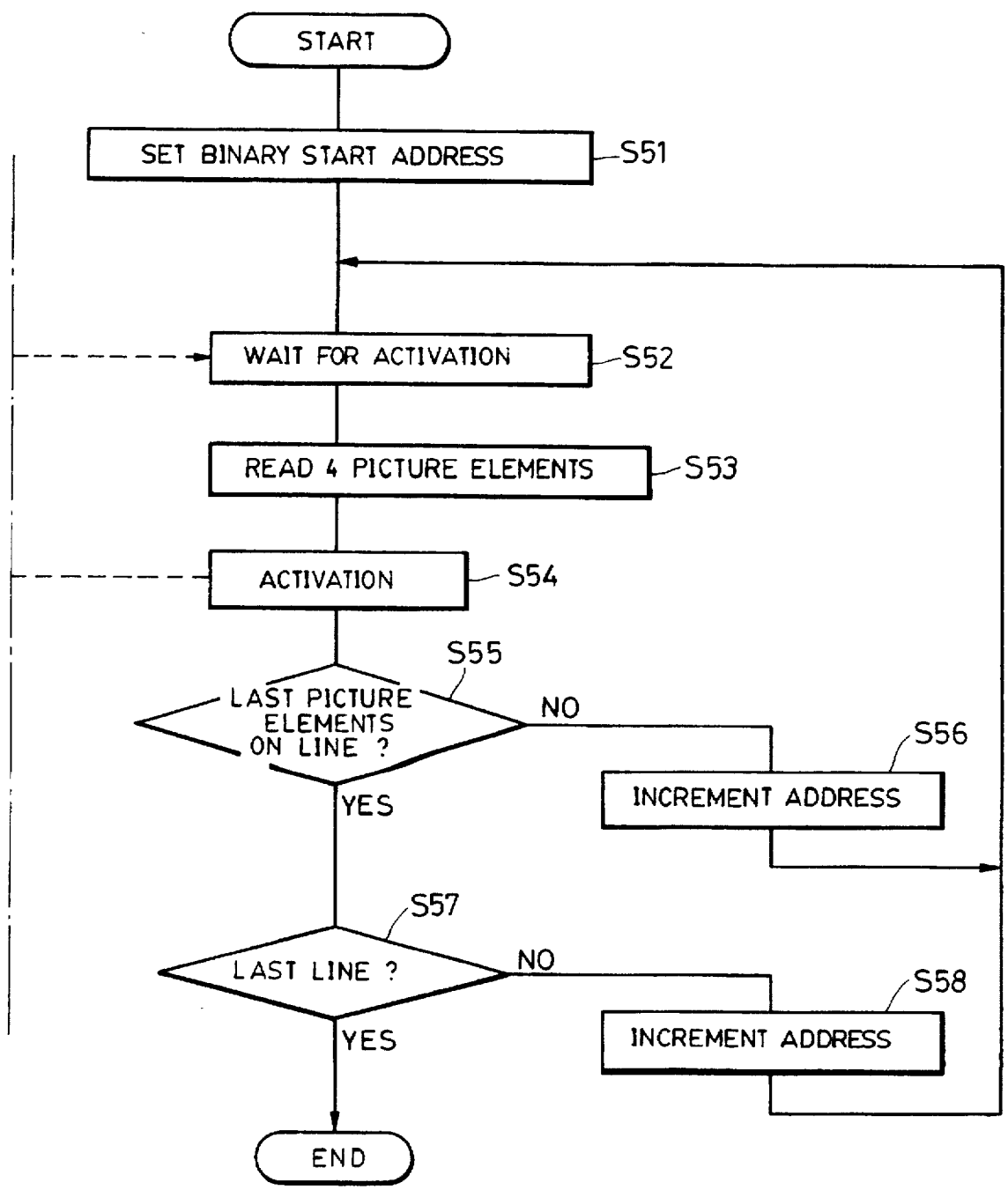
FIG. 9, composed of FIGS. 9A and 9B, is a flowchart showing reading processing for the color assigning circuit 19.

Next, an explanation will be provided of the corresponding-reading operation of binary-coded image data within the binary-coded IMEM 15 and color image data within the color IMEM 16 by the read control circuit 17 shown in FIG. 1 with reference to FIGS. 7–9.

FIG. 7 is a flowchart illustrating the reading operation of the the read control circuit 17 for the contour assigning circuit 18.

In FIG. 7, steps S1–S13 show a processing procedure for reading color image data, and steps S14–S25 show a processing procedure for reading binary-coded image data. The two processing procedures are synchronized by steps S6 and S15, and steps S19 and S7 so that binary-coded image data and color image data are correspondingly read.

The processing procedures will now be explained in detail.

A reading operation must start from the reference picture element start address shown in FIG. 5(B) since surrounding respective individual picture elements are needed for the contour assigning circuit 18 as reference picture elements, as will be described later. At step S1, the reference picture element start address is set in order to prepare for the reading operation. Subsequently, in a subroutine at step S2, 2×3 picture elements comprising 2 picture elements in the main-scanning direction and 3 picture elements in the subscanning direction are read, and preparation for reading color image data for one line is completed. Steps S3–S5 represent a processing procedure for reading one picture element in the main-scanning direction and three picture elements in the subscanning direction. At step S3, one picture element is read. At step S4, it is determined whether or not reading for three lines has ended. If the result of determination is negative, the process proceeds to step S5 for reading a picture element in the same column on the next line, where the color offset shown in FIG. 5(B) is added. The process then returns to step S3. If the result of the determination at step S4 is affirmative, that is, reading for 1×3 picture elements of the color image data has ended, the process proceeds to step S6.

By the above-described processing including the processing at step S2, a 3×3 picture element block of the color image data have been read, and the contour assigning circuit 18 becomes operable. At step S6, activation is performed for step S15, which is in a waiting state in the binary-coded image data reading procedure, to start reading of 4×4 picture elements. Activation is awaited at step S7. The process proceeds to step S8 when binary-coded image data for the 4×4 picture elements have been read and activation has been performed for step S7 at step S19 (see below).

At step S8, it is determined whether or not the read picture element is the last picture element on the line. If the result of determination is negative, at step S9, in order to read 1×3 picture elements for three lines on the next columnm (in order to move one picture element to the right to a new picture element of interest, or under consideration), the address is incremented by one to update the address to the position of the next column and the color offsets for two lines are subtracted from the address. It is thereby possible to update the start address for the next picture-element reading operation to the uppermost line of the three lines. If the result of determination at step S8 is affirmative, that indicates the end of the reading operation for one line, and the process proceeds to step S10.

As explained with reference to FIGS. 6(A) and 6(B), 4×4 picture elements of binary-coded image data correspond to one picture element of color image data. Hence, color image data are used four times since they are referred to for binary-coded image data for four lines, but the contour assigning circuit 18 does not include line buffers for temporarily storing color image data in units of a line. Accordingly, the read control circuit 17 must repeat reading processing of color image data for three lines four times. Hence, it is determined whether or not the reading processing has been repeated four times at step S10. If the result of this determination is negative, at step S10, in order to repeat the reading processing, the address is incremented by one to carry it to the position of the leading address on the next line, and is returned to the leading address at the preceding reading processing by subtracting the color offsets for three lines. The process then returns to step S2. If the result of the determination at step S10 is affirmative, that indicates that the reading processing has been repeated four times. Hence, the process proceeds to step S12, where it is determined whether or not the reading processing is for the last line. If the result of this determination is negative, the process proceeds to step S13, where the address is incremented to carry it to the position of the leading address on the next line, and is carried to the position of the leading address on the line shifted by one line by subtracting the color offsets for two lines. The process then returns to step S2. If the result of the determination at step S12 is affirmative, the process is ended.

An explanation has been provided of a reading procedure of color image data. An explanation will now be provided of a reading procedure for binary-coded image data.

At step S14, the binary start address is set to prepare for a reading operation. At step S15, activation from the color image data reading side is awaited. When activation has been performed, the process proceeds to step S16. In a processing procedure at steps S16–S18, a reading operation for a 4×4 picture element matrix comprising 4 picture elements in the main-scanning direction and 4 picture elements in the subscanning direction is performed. When the reading operation has ended, activation is performed for the color image data reading side at step S19, and the process proceeds to step S20. The processing procedure at steps S20–S25 corresponds to steps S8–S13 for the color image data reading operation, and the same processing is performed except that the subtraction of the binary offsets for one more line is performed since the binary-coded image data side has units of four lines. At steps S20 and S21, reading processing in units of four lines in the main-scanning direction is performed. At steps S22 and S23, the above-described processing is repeated four times. At steps S24 and S25, the above-described processing is performed until the last line, and the processing procedure is ended.

FIG. 8 is a flowchart showing a processing procedure of a subroutine for reading the 2×3 picture elements at step S2 shown in FIG. 7.

First, at step S31, one picture element is read. At step S32, it is determined whether or not reading for three lines has ended. If the result of this determination is negative, the address is carried to the address of the same column on the next line by adding the color offset at step S33, and the process returns to step S31. If the result of the determination at step S32 is affirmative, the process proceeds to step S34, where it is determined whether or not the reading operation is for the second line. If the result of this determination is negative, the process proceeds to step S35. At step S35, in order to perform a reading operation from the leading line of the next column, the address is incremented, and the color offsets for two lines are subtracted. If the result of the determination at step S34 is affirmative, the processing of the subroutine has been ended, and the process returns to the processing shown in FIG. 7.

FIG. 9 is a flowchart showing a reading processing procedure of the read control circuit 17 for the color assigning circuit 19. In FIG. 9, steps S41–S58 show a processing procedure for reading color image data, and steps S51–S58 show a processing procedure for reading binary-coded image data. As in the reading processing procedure for the contour assigning circuit 18 shown in FIG. 7, the two process procedures in the present flowchart are synchronized by steps S43 and S52, and steps S54 and S44. Since the color assigning circuit 19 uses color image data within the color IMEM 16 as color assigning information for a 4×4 picture element matrix of corresponding binary-coded image data, the color image data for one line are repeatedly read four times. Since reference picture elements are not needed, the reading operation is started from the color start address shown in FIG. 5(B). Hence, at step S41, the color start address is set in order to prepare for the reading operation. Next, at step S42, color image data for one picture element are read. At step S43, a reading operation at the binary-coded image data side is activated. Subsequently, at step S44, the process waits until corresponding binary-coded image data are read. When activation has been performed at step S54, the process proceeds to step S45, where it is determined whether or not the picture element in consideration is the final picture element on the line. If the result of this determination is negative, in order to read the next one picture element in the main-scanning direction, the address is incremented by one at step S46, and the process then returns to step S42. If the result of the determination at step S45 is affirmative, the process proceeds to step S47, where it is determined whether or not the reading operation has been repeated four times. If the result of the determination at step S47 is negative, at step S48, the address is incremented to carry it, and is returned to the leading address on the same line by subtracting the color offset, and the process returns to step S42.

If the result of the determination at step S47 is affirmative, the process proceeds to step S49, where it is determined whether or not the picture element in consideration is on the last line. If the result of the determination at step S49 is negative, at step S50, the address is incremented three times to carry it (including reference picture elements) to be the leading address on the next line, and the process then returns to step S42. If the result of the determination at step S49 is affirmative, the proceeding procedure is ended.

Next, an explanation will be provided of the reading procedure of binary-coded image data.

At step S51, the binary start address is set to prepare for a reading operation. Subsequently, at step S52, activation is awaited. If activation has been performed from step S43, the process proceeds to step S53. At step S53, binary-coded image data for four picture elements are read. Subsequently, at step S54, activation is performed for a reading operation of color image data. The process then proceeds to step S55, where it is determined whether or not the read picture element is the last picture element on the line. If the result of this determination is negative, the address is incremented by one at step S56, and the process returns to step S52. If the result of the determination at step S55 is affirmative, it is determined whether or not the read picture element is on the last line at step S57. If the result is negative, the address is incremented by one at step S58, and the process returns to step S52. If the result of the determination at step S57 is affirmative, the proceeding procedure is ended.

Figure 10A:
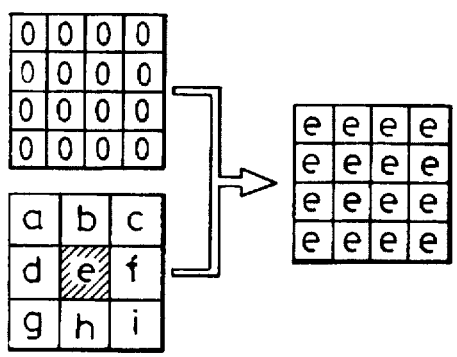
FIGS. 10(A)–10(T) show examples of contour assigning processing.
Figure 10B:
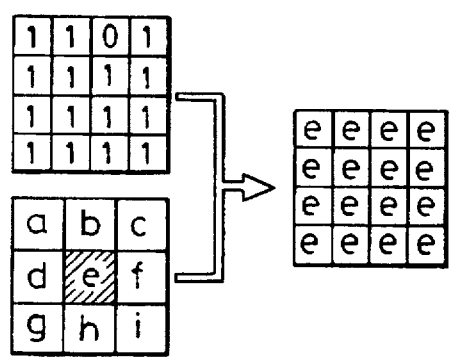
Figure 10C:
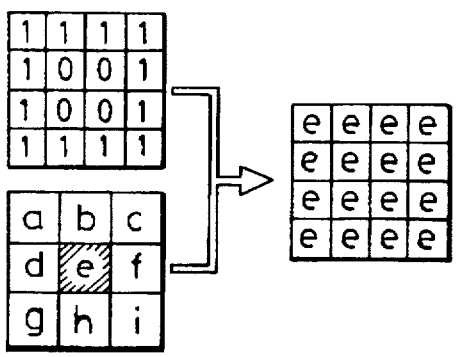
Figure 10D:
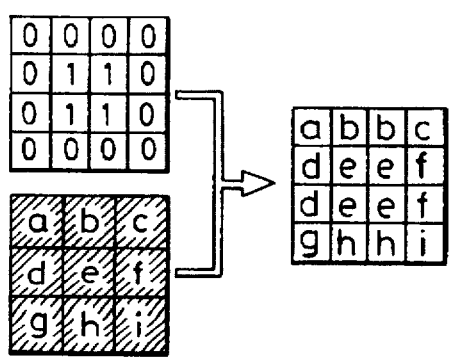
Figure 10E:
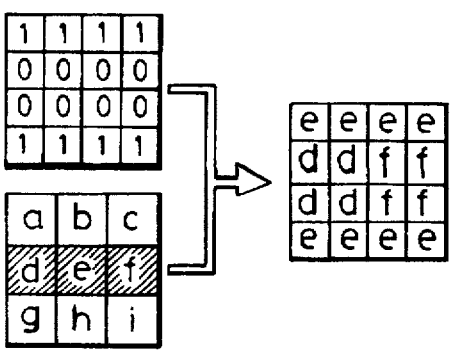
Figure 10F:
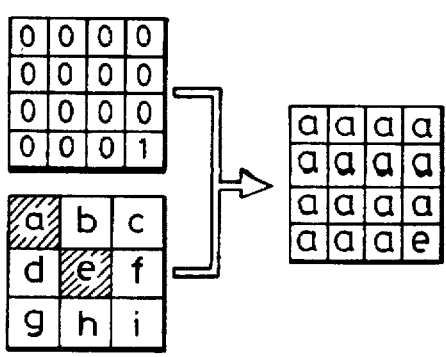
Figure 10G:
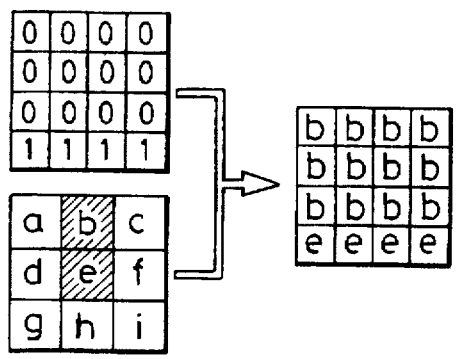
Figure 10:
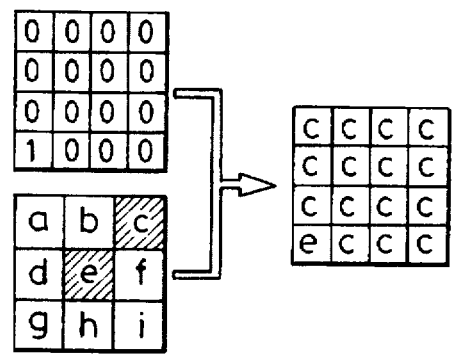
Figure 10:
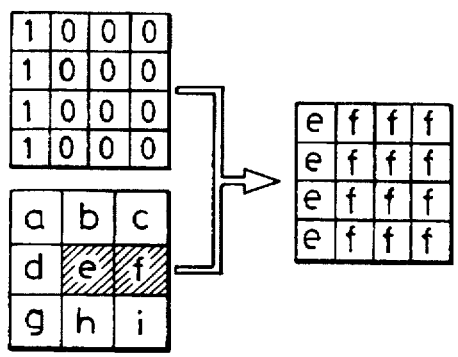
Figure 10:
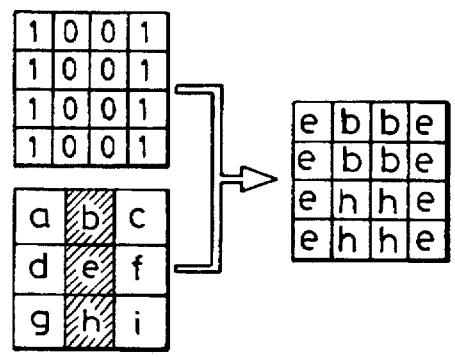
Figure 10:
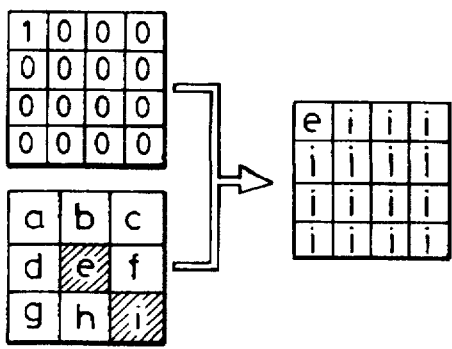
Figure 10:
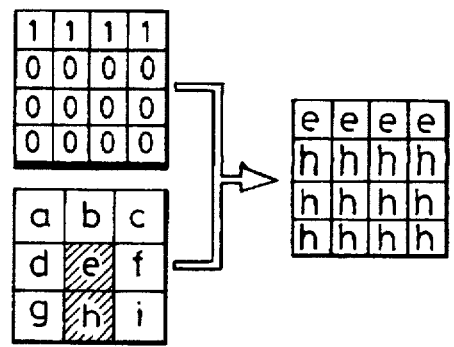
Figure 10:
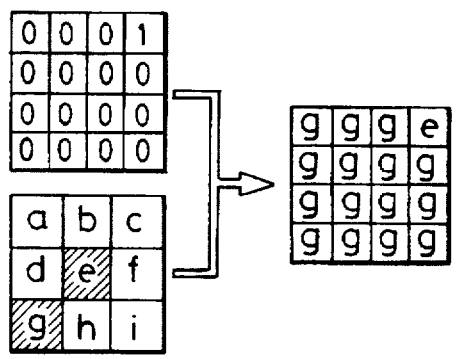
Figure 10:
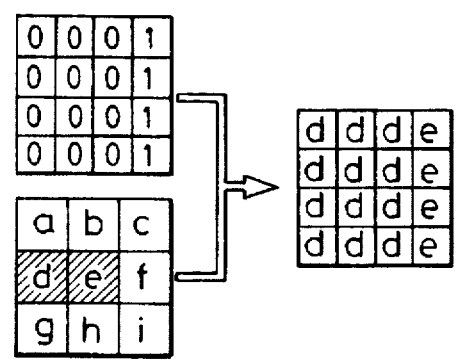
Figure 10:
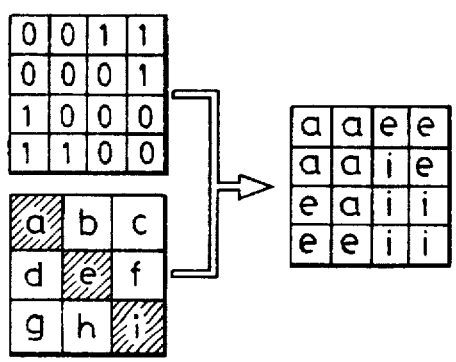
Figure 10:
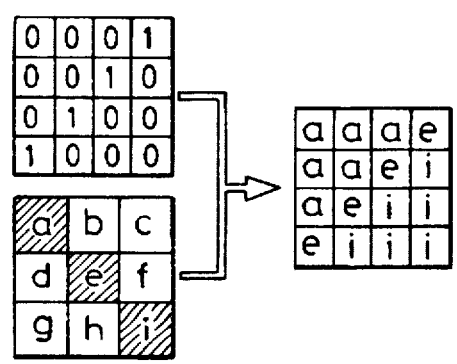
Figure 10:
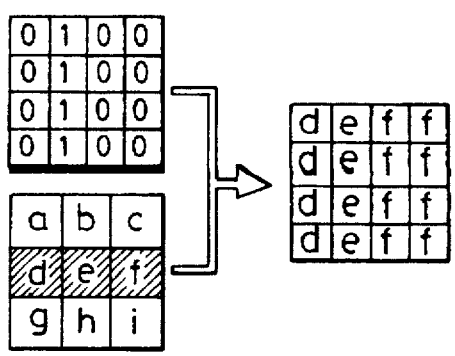
Figure 10:
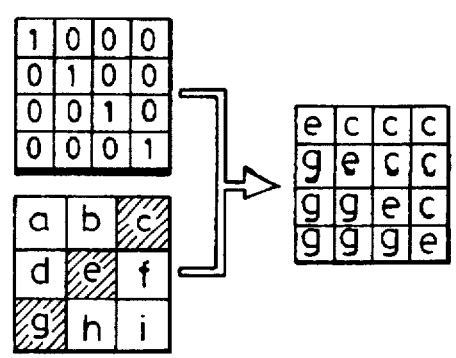
Figure 10S:
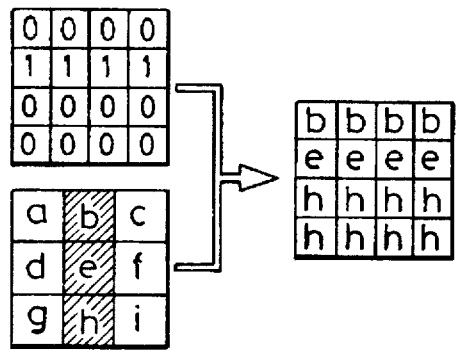
Figure 11A:
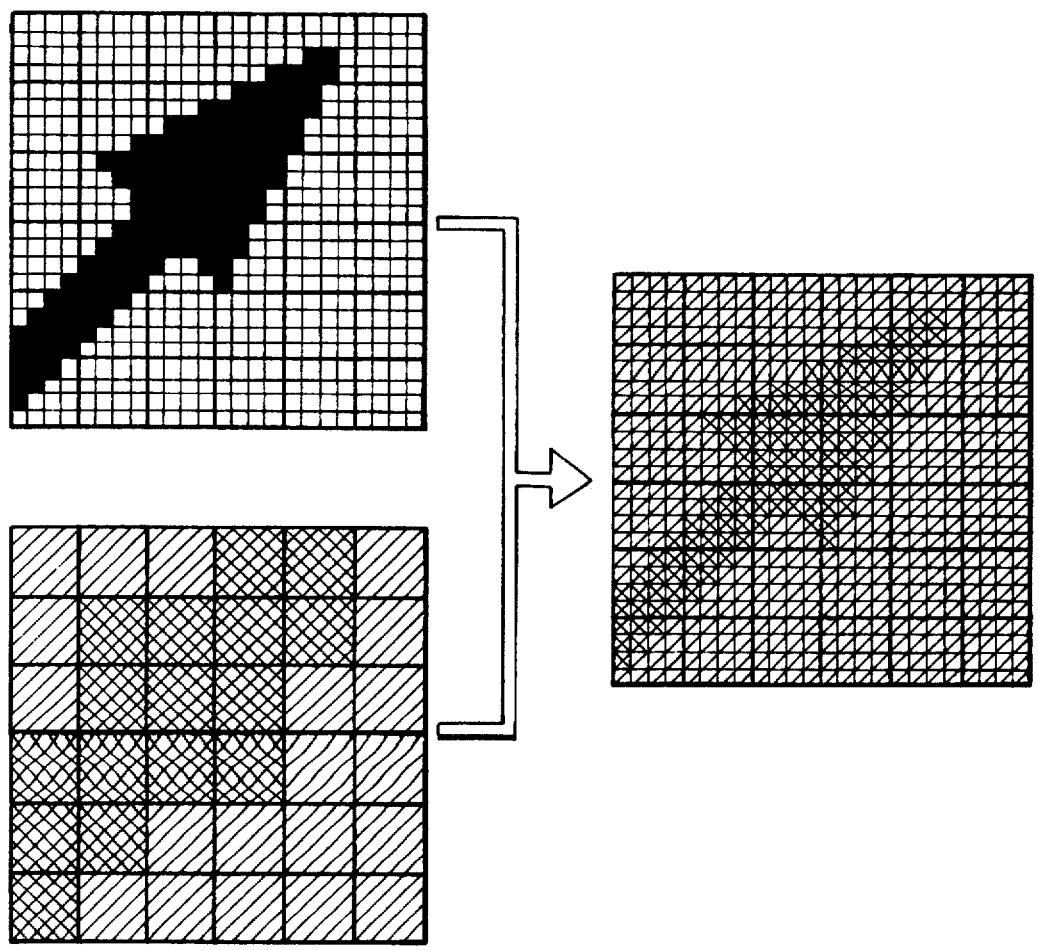
FIGS. 11(A), 11(B), 12(A) and 12(B) show examples of actual contour assigning processing.
Figure 11B:
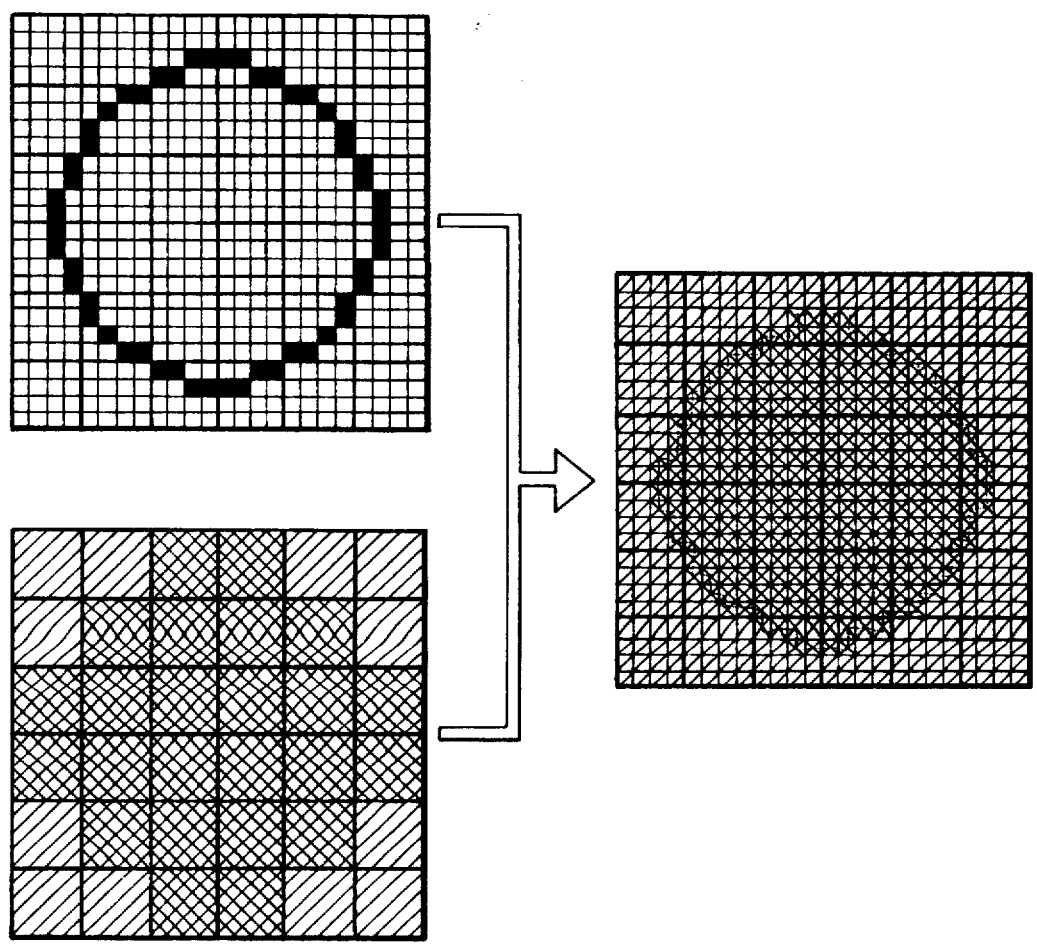
Figure 12:
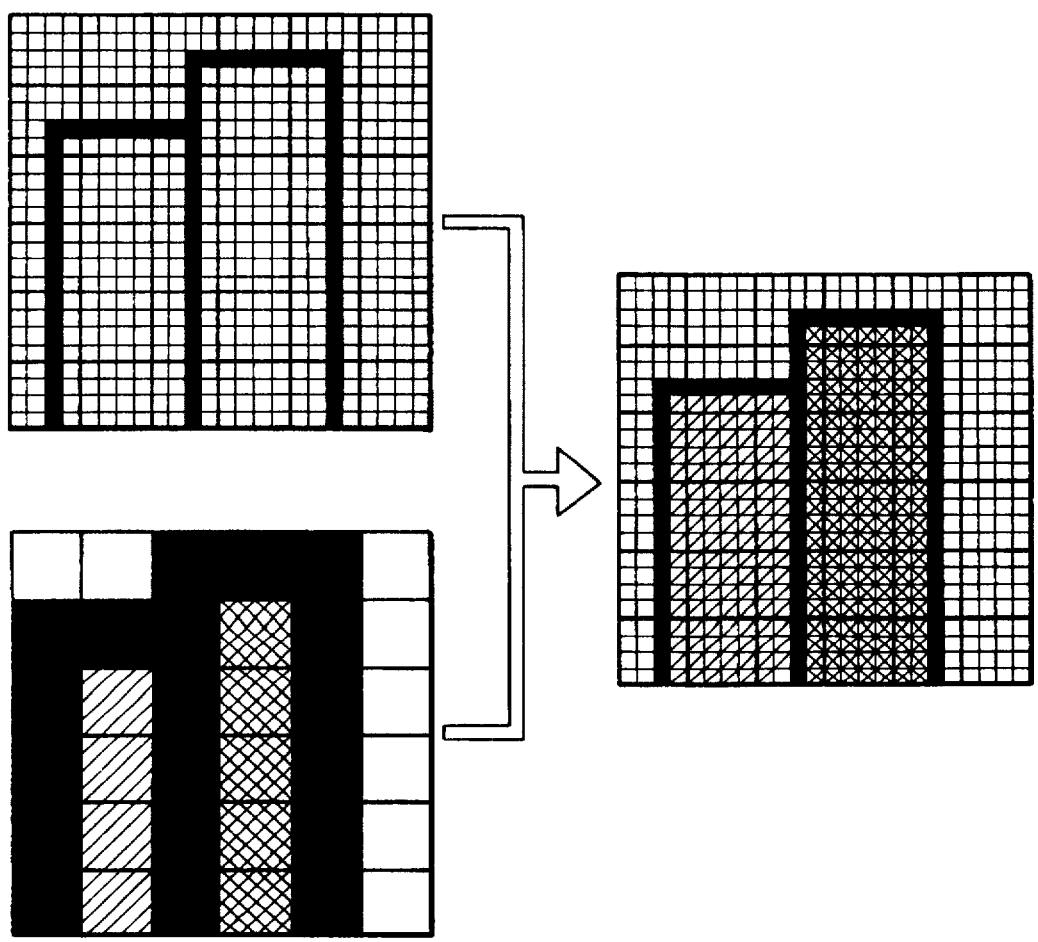

Next, a detailed explanation will be provided of the operation of the contour assigning circuit 18 shown in FIG. 2 with reference to FIGS. 10–12.

According to the above-described processing (the flowchart shown in FIG. 7), binary-coded image data are stored in the 4×4 picture element matrix constituted by the FFs 32a–32p shown in FIG. 2, and color image data corresponding to the 4×4 picture element matrix are stored in the 24-bit FF 36e (in the center of the 3×3 block).

When assigning a contour, since reference picture elements are needed, color image data for surrounding 8 picture elements are stored in the 24-bit FFs 36a–36d, and 36f–36g, and constitute a 3×3 picture element matrix together with the 24-bit FF 36e. Binary-coded image data read by the read control circuit 17 are sequentially stored in the SRs 31a–31d in units of a 4×4 picture element matrix. When the processing of the 4×4 picture element matrix constituted by the FFs 32a–32p has been completed, the data are transferred from the SRs 31a–31d to the FFs 32a–32p. Table information for determining the pattern of the 4×4 picture element matrix has previously been stored in the contour assigning table ROM 33. The pattern of the 4×4 picture element matrix from the FFs 32a–32p is determined, the 4×4 picture element matrix is scanned in units of one picture element by signals from the main-scanning counter 34 and the subscanning counter 35, and which picture element within the 3×3 picture element matrix should be selected is determined for every picture element. Image information selected by the selector 37 is output as 24-bit image data.

Figure 10T:
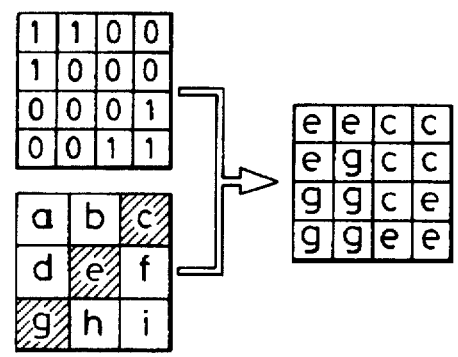

FIGS. 10(A)–10(T) show examples of contour assigning processing, each illustrating how a 4×4 picture element matrix after contour assigning processing is obtained from a 4×4 picture element matrix and a 3×3 picture element matrix.

In FIGS. 10(A)–10(T), respective 4×4 matrices filled with "0"s and "1"s correspond to the FFs 32a–32p shown in FIG. 2, and respective 3×3 matrices filled with letters a–i correspond to the 24-bit FFs 36a–36i. Each 4×4 matrix filled with letters is an image data output after contour assigning memt.

In an example shown in FIG. 10(A), all the picture elements in the 4×4 picture element matrix are replaced by central picture element data e. In an example shown in FIG. 10(T), picture elements in the 4×4 picture element matrix are replaced by picture element data c, e and g. Thus, the pattern of each 4×4 picture element matrix is determined, and replacing processing which is most suitable for each pattern is performed.

FIGS. 11(A), 11(B), 12(A) and 12(B) illustrate actual contour assigning processing.

Figure 12B:
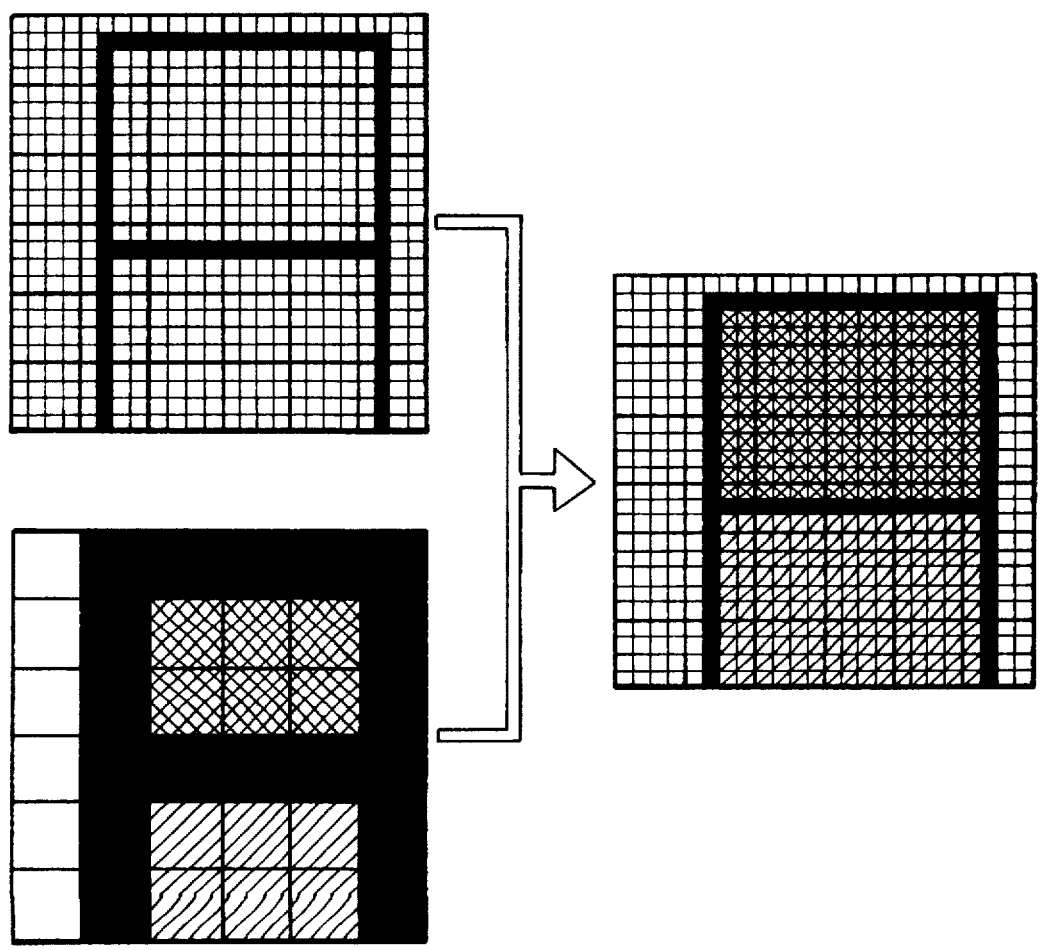

FIG. 11(A) shows an example of a figure shaped like an arrow, and FIG. 11(B) shows an example of a figure shaped like a circle. FIGS. 12(A) and 12(B) show examples of bar graphs. In each example, it can be seen that 24-bit color image data with a resolution of 400 dpi have been obtained as a result of contour assigning processing.

Next, an explanation will be provided of the operation of the color assigning circuit 19 shown in FIG. 3.

In FIG. 3, color image data from the color IMEM 16 and background-color data from the mode control circuit 24 are input to the selector 41. The color image data are output when binary-coded image data is active ("1"), and the background-color data are output when the binary-coded image data is inactive ("0").

Figure 13A:
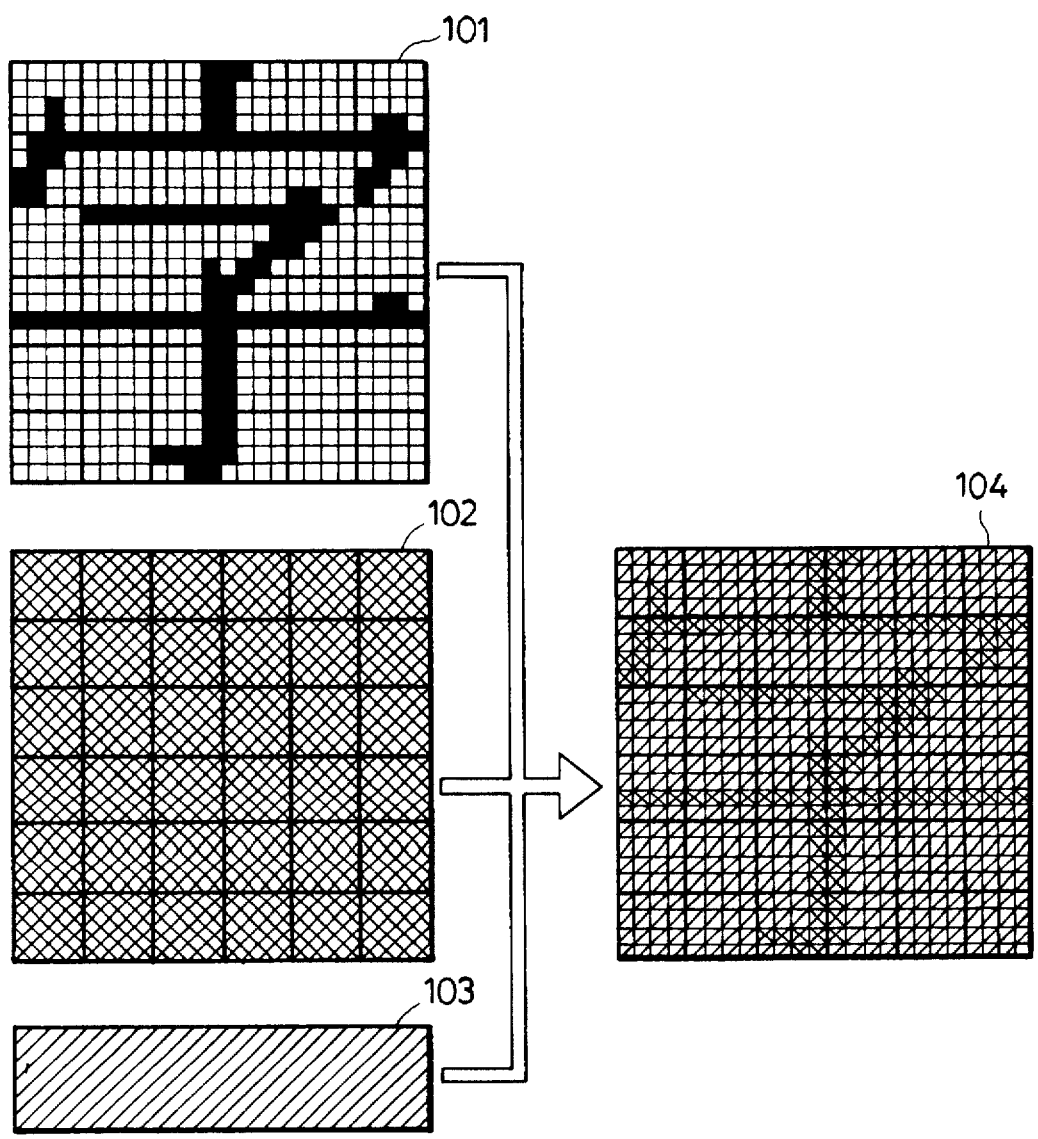
FIGS. 13(A) and 13(B) show examples of color assigning processing by the color assigning circuit 19.
Figure 13B:
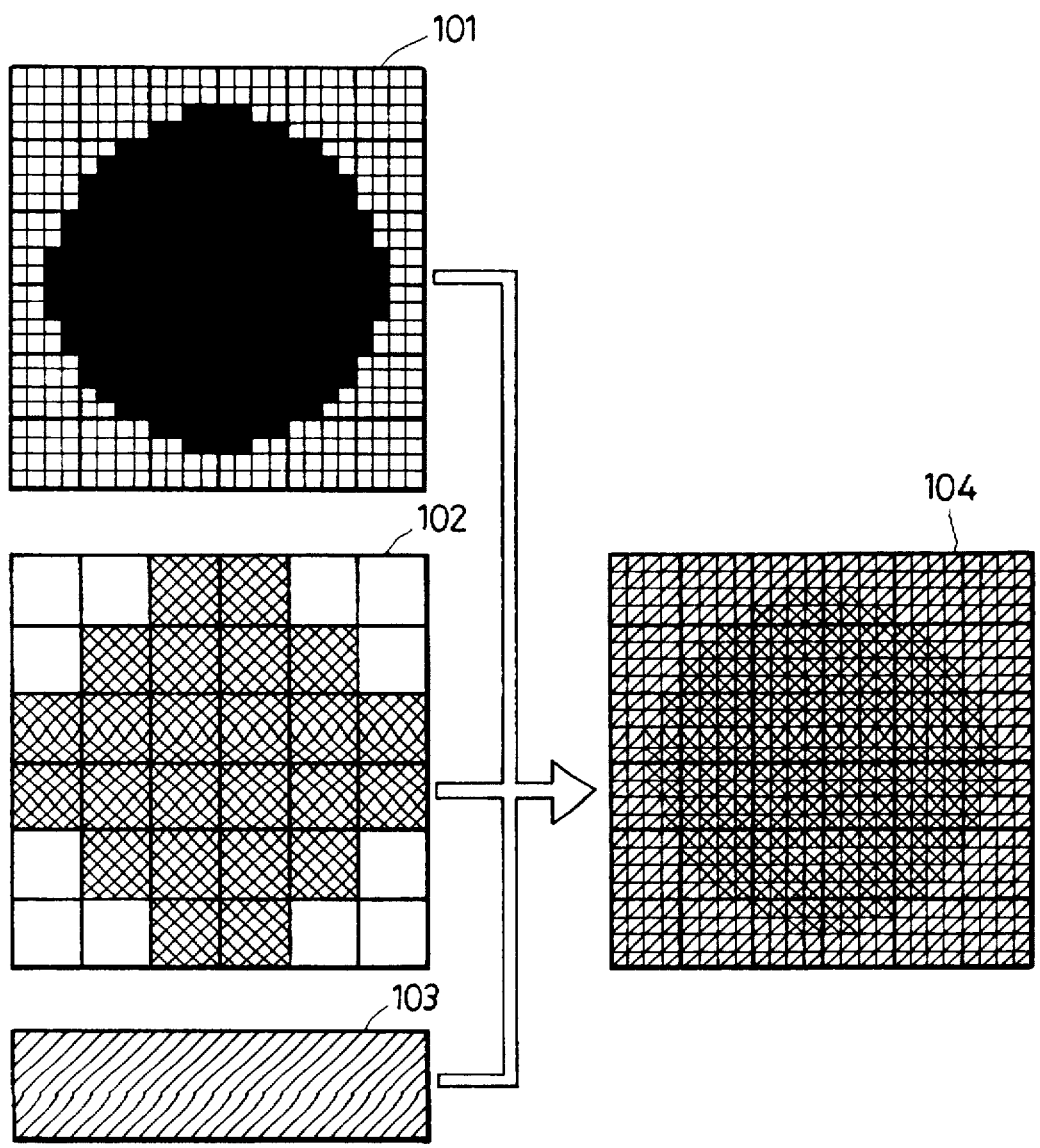

FIGS. 13(A) and 13(B) show examples of actual color assigning processing. In FIGS. 13(A) and 13(B), in each example 101, a pattern is depicted in a 24×24 matrix as binary-coded image data. In each example 102, color assignment is performed with corresponding color image data. In each example 103, background-color data are assigned by the background-color register. In each example 104, an output obtained as a result of color assigning processing is shown. Specifically, FIG. 13(A) illustrates color assignment for the Chinese character "字", and FIG. 13(B) illustrates color assignment for a figure "circle". In the case of FIG. 13(B), if a photograph has been input in the color image data, the interior of the circle can be filled with photographic data, and the outer circumference of the photograph can be assigned to be a circle with a resolution of 400 dpi.

Next, an explanation will be provided of the background-color register 22, the mode control register 23, and the mode control circuit 24 shown in FIG. 4.

FIG. 15(C) shows an example of defining a mode and a background color. As described above, the present embodiment includes the contour assigning circuit 18 and the color assigning circuit 19 which must be used for photographic images and characters, respectively, in order to fully utilize features of the respective circuits. Hence, as shown in FIG. 15(C), two windows, i.e., window 1 and window 2, are defined so that the contour assigning circuit 18 is effective within the windows, and the color assigning circuit 19 is effective outside the windows. Furthermore, two back ground colors, i.e., background color 1 and background color 2, and background-color window are defined so that the background color 2 is effective within the background-color window, and the background color 1 is effective outside the background-color window. For each window, a start address and an end address of the window are defined by the X-Y address in units of one picture element at arbitrary positions on paper. That is, window 1 is defined by $(X_{1S}, Y_{1S})$ and $(X_{1E}, Y_{1E})$, window 2 is defined by $(X_{2E}, Y_{2E})$, and the background-color window is defined by $(X_{BS}, Y_{BS})$ and $(X_{BE}, Y_{BE})$. In order to thus define these windows, predetermined values are set in the respective registers shown in FIG. 4. That is, the X-Y addresses $(X_{1S}, Y_{1S})$ and $(X_{1E}, Y_{1E})$ defining window 1 shown in FIG. 15(C) are set in the $X_{1S}$ register 51, $X_{1E}$ register 52, $Y_{1S}$ register 53 and $Y_{1E}$ register 54. An X-Y address currently being printed on paper is sequentially updated in the X address counter 65 and the Y address counter 66. The comparator 67 compares data in the $X_{1S}$ register 51 with data in the X address counter 65. If the two data coincide, the value "1" is input to terminal J of the JK-FF 79 to set the JK-FF 79. The comparator 68 compares data in the $X_{1E}$ register 52 with data in the X address counter 65. If the two data coincide, the value "1" is input to terminal K of the JK-FF 79 to reset the JK-FF 79. The comparator 69 compares data in the $Y_{1S}$ register 53 with data in the Y address counter 66. If the two data coincide, the value "1" is input to terminal J of the JK-FF 80 to set the JK-FF 80. The comparator 70 compares data in the Y1E register 53 with data in the Y address counter 66. If the two data coincide, the value "1" is input to terminal K of the JK-FF 80 to reset the JK-FF 80. Accordingly, the JK-FF 79 is reset to effective interval "1" of window 1 in the direction X, and the JK-FF 80 is reset to effective interval "1" of window 1 in the direction Y. Hence, by obtaining a logical product of outputs from the JK-FFs 79 and 80 by the AND 85, an effective interval signal for window 1 is obtained. Similarly, effective intervals for window 2 and background-color window are obtained from outputs from the ANDs 86 and 87, respectively. A logical sum of outputs from the AND 85 and 86 is obtained by the OR 88. OR signal of effective intervals of window 1 and window 2 is input to the selector 20 shown in FIG. 1 as a mode switching signal to be used as a selection signal to select between outputs from the contour assigning circuit 18 and the color assigning circuit 19. Data indicating a background color for the entire paper are stored in the background-color-1 register 63, and background-color data within the background-color window are stored in the background-color-2 register 64. Outputs from the background-color-1 register 63 and the background-color-2 register 64 are input to the selector 89, are selected by a background-color window effective interval signal which is an output signal from the AND 87, and the selected signal is input to the color assigning circuit 19 shown in FIG. 1. The background-color window effective interval signal is, of course, specified by values stored in the $X_{BS}$, $Y_{BS}$, $X_{BE}$ and $Y_{BE}$ registers.

Figure 14:
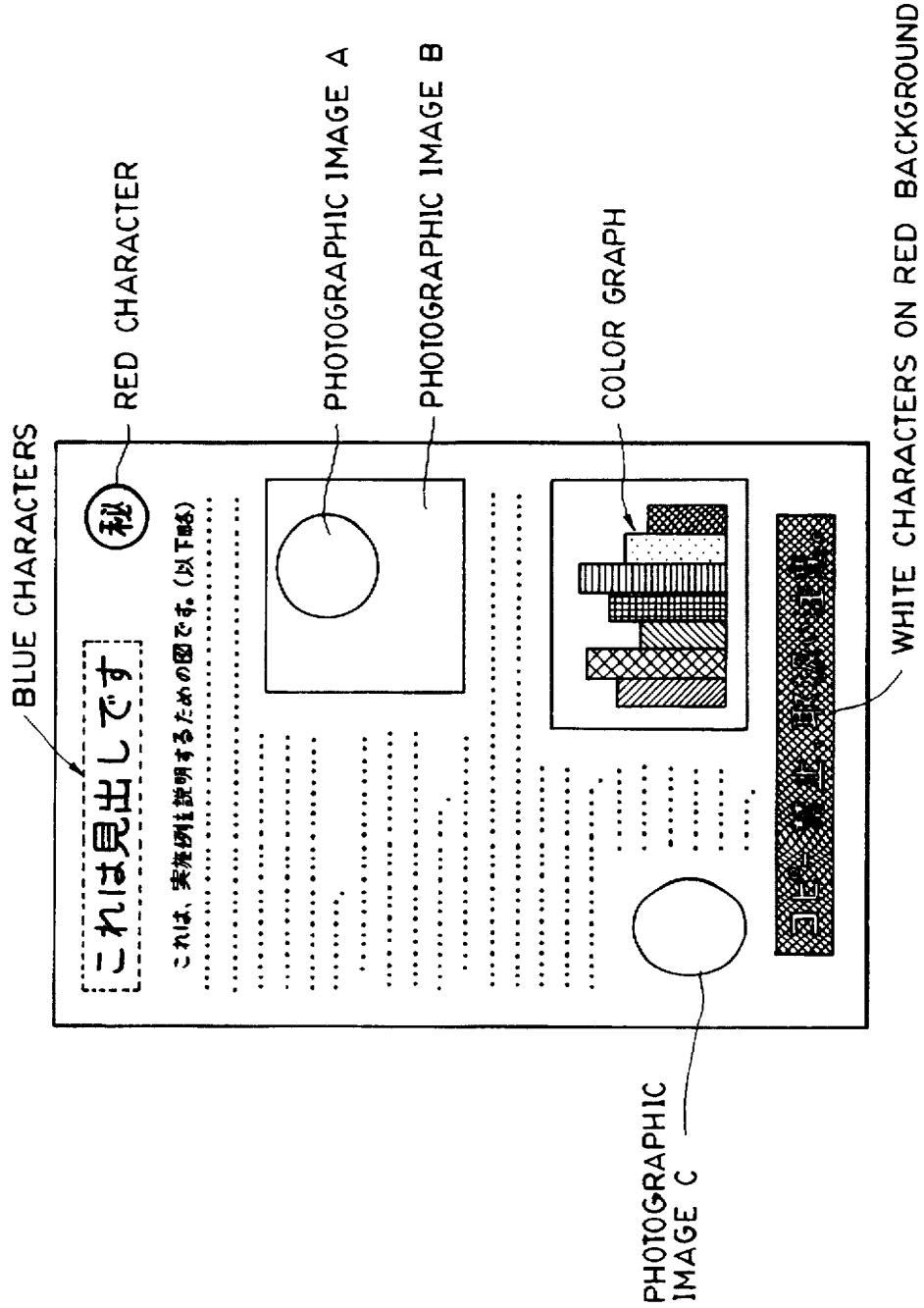
FIG. 14 shows an example of printing output obtained according to the first embodiment.

An explanation will now be provided of the operation of the image control unit 13 with reference to FIGS. 14, 15(A), 15(B) and 15(C). FIG. 14 is an example of printing output, which comprises blue characters in a caption, black characters in the text, a red character, and white characters on red background in notes, a photographic image obtained by synthesizing photograph A in photograph B, a photographic image C, and a color graph.

The photographic portion comprising photographs A and B, and the color graph portion are defined by windows 1 and 2, respectively, and use a contour assigning mode. Other portions use a color assigning mode. Particularly, a white-characters-on-red-background portion uses the background-color window +background color 2. FIGS. 15(A)–15(C) show examples of setting for obtaining the printing example shown in FIG. 14. FIG. 15(A) shows an example of setting the binary-coded IMEM 15. FIG. 15(B) shows an example of setting of the color IMEM 16. FIG. 15(C) shows an example of setting the background-color register 22 and the mode control register 23. In FIG. 15(C), window 1, window 2 and the background window are set to positions corresponding to the printing example shown in FIG. 14. Background color 1 is a background color of the entire paper. White is set in this case. Background color 2 is set to red in order to realize white characters on red background. In FIG. 15(A), within window 1, in order to synthesize the photographic image A and the photographic image B with a resolution of 400 dpi, contour assignment for the photographic images is performed. Within window 2, contour assignment for the bar graph is performed. Print characters are expanded on other portions in the color assigning mode. However, the portion in FIG. 15(A) corresponding to the photographic image C shown in FIG. 14 is filled with "1" s in order to perform photographic printing in the color assigning mode. FIG. 15(B) shows an example of color assignment. A synthesized image of the photographic image A and the photographic image B is included within window 1 with a resolution of 100 dpi. Color data assigning colors for the graph portion and white data for other portions are included within window 2. In color-assigning-mode portions outside the windows, data of the photographic image C are included in a portion corresponding to the photographic image C shown in FIG. 14, and white data are included in the surrounding portion. White data are included in the white-characters-on-red-background portion since white characters are used. Blue data, red data, black data are included in the blue-character portion, red-character portion and the remaining text portion, respectively. By setting as described above, the printing example shown in FIG. 14 can be obtained.

An explanation has been provided of an example wherein line buffers are not provided within the contour assigning circuit 18 and the color assigning circuit 19, and the read control circuit 17 performs control to read identical data a plurality of times. However, line buffers may be provided within the contour assigning circuit 18 and the color assigning circuit 19 to reduce the number of reading operations and to simplify the configuration of the read control circuit 17. Furthermore, when the line buffers are provided, the contour assigning circuit 18 and the color assigning circuit 19 may share the line buffers to effectively utilize them.

In the foregoing embodiment, the reading processing by the read control circuit 17 is separated for the contour assigning circuit 18 and the color assigning circuit 19. However, since all the data necessary for the color assigning circuit 19 are included within data for the contour assigning circuit 18, data necessary for the color assigning circuit 19 may be extracted from read data for the contour assigning circuit 18 to be used for the color assigning circuit 19.

In addition, various changes and modifications may be made without departing from the true spirit and scope of the present embodiment.

As explained above, according to the present embodiment, by effectively using a memory for storing images having a small amount of information per picture element with a high resolution, and a memory for storing images having a large amount of information per picture element with a low resolution, utilizing features of the respective memories, an image output having a high picture quality can be obtained with a small amount of information.

It is thereby possible to reduce the number of devices for storing respective amounts of information, and nonetheless to suppress deterioration in picture quality caused by reducing the amount of information.

Furthermore, it becomes possible to efficiently use memories, and to output an image having a high picture quality and a high resolution.

Moreover, it becomes possible to reproduce, particularly, edge portions of an image having a relatively low resolution wherein a plurality of bits are allocated for one picture element with a high resolution.

In addition, it becomes possible to reproduce an image having a high resolution represented by one bit per picture element as an image represented by a plurality of bits per picture element.

Embodiment 2

A second embodiment of the present invention will now be explained in detail with reference to the drawings.

<Configuration of Apparatus>

FIG. 18 is a block diagram showing the configuration of an image processing apparatus according to the present embodiment.

In FIG. 18, a CPU 301 for calculation/control controls the entire apparatus. A main memory (hereinafter termed a MEM) 302 temporarily stores programs and the like, and is also used as work areas. A communication interface (hereinafter termed a communication I/F) 303 is connected to an LAN (local area network). A keyboard 304 is used for inputting character codes and the like. A pointing device 305 indicates the position of a cursor on a display picture surface. An input device interface 306 (hereinafter termed a KEY I/F) controls input devices, such as the keyboard 304, the pointing device 305 and the like. A system bus 307 transmits address data, control signals and the like. A CRT display (hereinafter termed a CRT) 308 serves as a display unit. A video RAM (hereinafter termed a VRAM) 309 serves as a memory for the CRT 308. There are also shown a floppy disk drive (hereinafter termed an FD) 310, a hard disk drive (hereinafter termed an HD) 311, a disk interface (hereinafter termed a DISK-I/F) 312 for controlling the FD 310 and the HD 311, an image control unit 313 which is a characteristic portion of the present embodiment, and an output device 314, such as a printer or the like.

Reference numbers 315–322 represent components of the image control unit 313. An image memory for characters/figures (hereinafter termed a character IMEM) 315 stores character/figure image data comprising 4 bits per picture element and having a resolution of 400 dpi. An image memory for photographs (hereinafter termed a photograph IMEM) 316 stores full-colored photographic image data comprising 24 bits per picture element and having a resolution of 100 dpi. A control memory 317 stores first control data for assigning the contour of a photographic image and second control data for synthesizing a character image and a photographic image. A color palette 318 selects 16 colors from among 16.7 million colors according to the character/figure image data stored in the character IMEM 315. A contour assigning circuit 319 performs the contour control of the photographic image data (resolution of 100 dpi) stored in the photography IMEM 316 in accordance with the first control data (resolution of 100 dpi) for contour assignment stored in the control memory 317. A look-up table (hereinafter termed an LUT) 320 performs color-tone conversion and color correction. A selector 321 selectively outputs data output from the color palette 318 and data output from the LUT 320 in accordance with the second control data for character/photograph synthesis control stored in the control memory 317. A read control circuit 322 synchronizes data reading from the character IMEM 315, the photography IMEM 316 and the control memory 317.

<Explanation of Operation>

The operation of the present embodiment will now be explained with reference to FIGS. 19(A)–26(B).

(Synchronization between Image Data and Control Data)

Figure 19A:
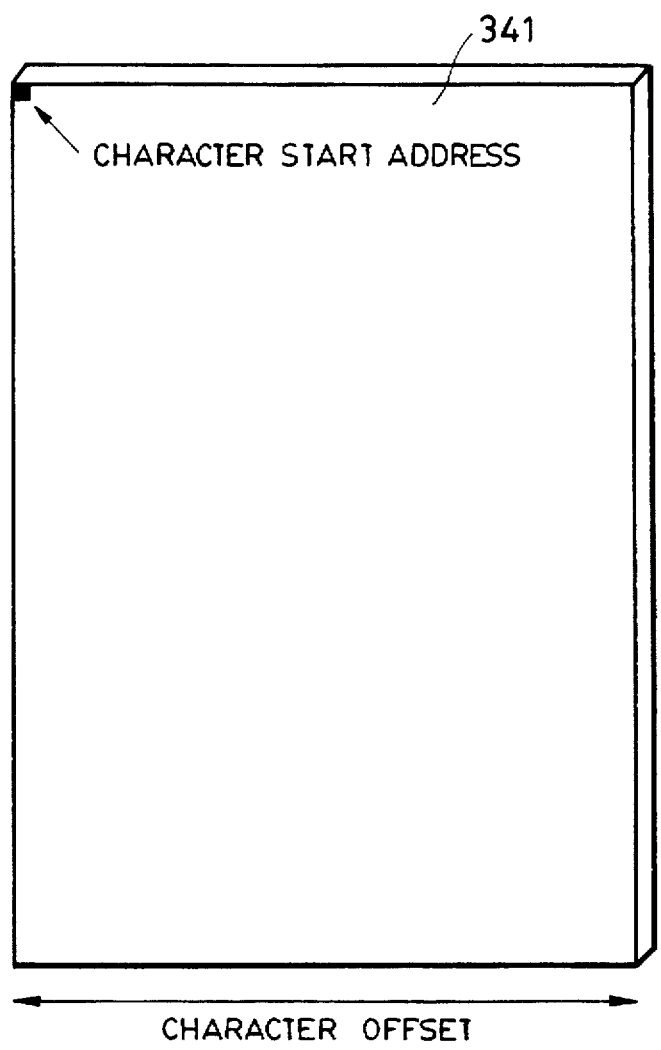
FIGS. 19(A)–19(C) illustrate how data are stored within a first character IMEM 315, a photography IMEM 316 and a control memory 317 shown in FIG. 18.
Figure 19C:
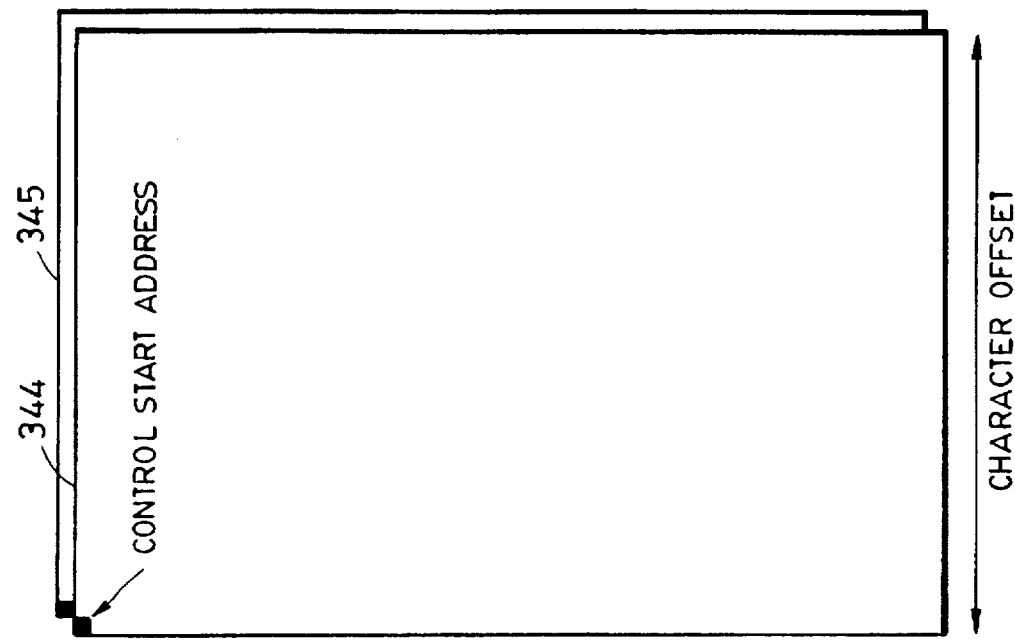
Figure 19B:
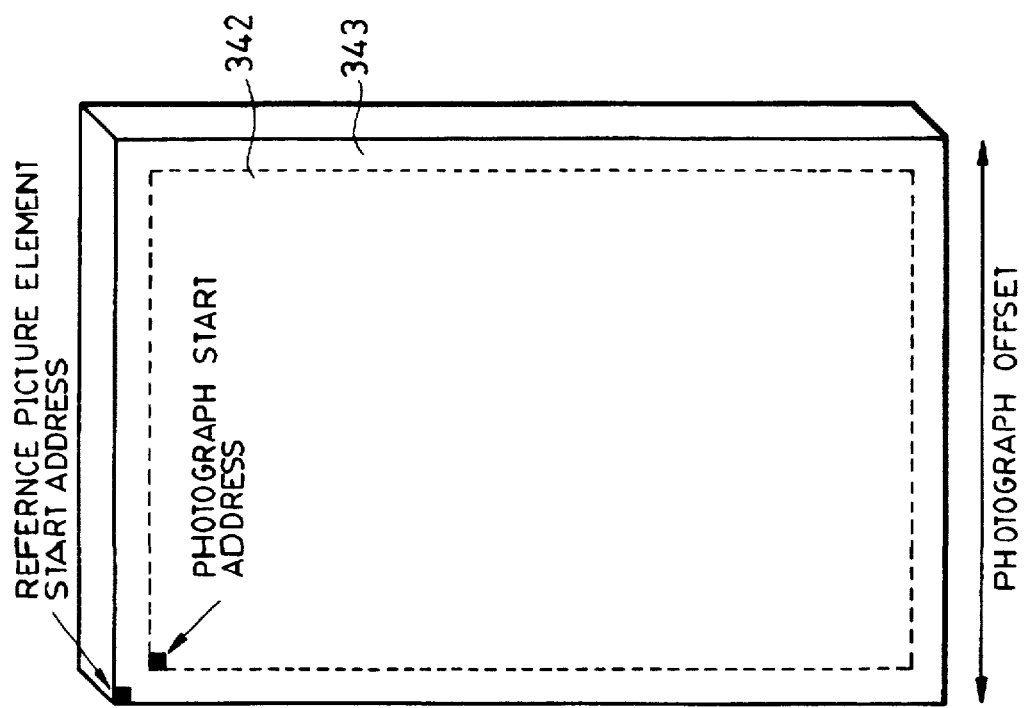

FIG. 19(A) shows how character/figure image data are stored within the character IMEM 315 shown in FIG. 18. FIG. 19(B) shows how photographic image data are stored within the photography IMEM 316 shown in FIG. 18. FIG. 19(C) shows how control data are stored within the control memory 317.

In FIG. 19(A), character/figure image data 341 are expanded in accordance with the size of paper for output, and are continuously stored from a character start address within the character IMEM 315. Hence, if an address corresponding to the data length of one line in the main-scanning direction is added, the result becomes data at the same column on the next line. This address is termed a character offset.

In FIG. 19(B), photographic image data 342 are expanded in accordance with the size of paper for output. Reference number 343 represents photographic image data including reference picture elements obtained by adding surrounding respective individual picture elements as reference picture elements for the contour assigning circuit 319. White data are usually input for the reference picture elements corresponding to surrounding respective individual picture elements. The photographic image data 343 including reference picture elements are continuously stored from a reference picture element start address within the photography IMEM 316. Hence, if the address corresponding to the data length for one line in the main-scanning direction is added, the result becomes data at the same column on the next line. This address is termed a photograph offset. The photographic image data 342 comprises portions obtained by removing surrounding respective one picture elements from the photographic image data 343 including reference picture elements. Hence, the photograph start address becomes the leading address.

In FIG. 19(C), first control data 344 are expanded in accordance with the size of paper for output. Second control data 345 are expanded in the same manner. Both the first control data 344 and the second control data 345 are continuously stored from a control start address within the control memory 317. The character IMEM 315 and the control memory 317 have different numbers of bits per picture element, but have the same resolution. Hence, the number of picture elements on one line in the main-scanning direction is identical. Accordingly, the offset value in the case of control data becomes identical to the character offset.

By reading the character image data 341, the photographic image data 342 and the control data from the character start address, the photograph start address and the control start address, respectively, in synchronization with one another, it is possible to correspondingly read the three kinds of data.

Figure 20A:
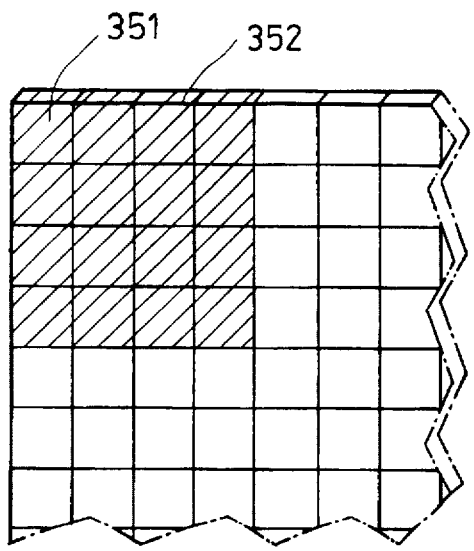
FIGS. 20(A)–20(C) illustrate the relationship of correspondence between picture elements of character/figure image data, photographic image data and control data.
Figure 20B:
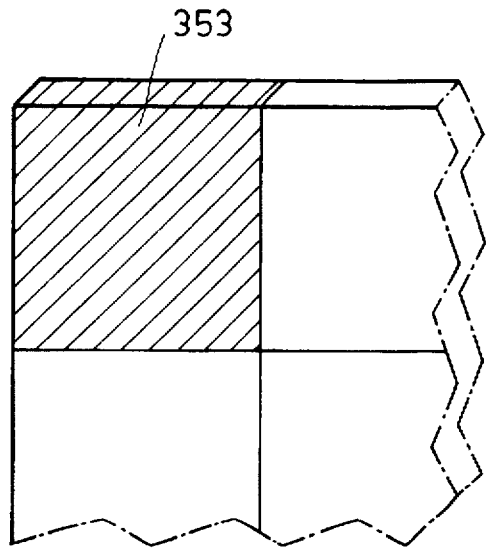
Figure 20C:
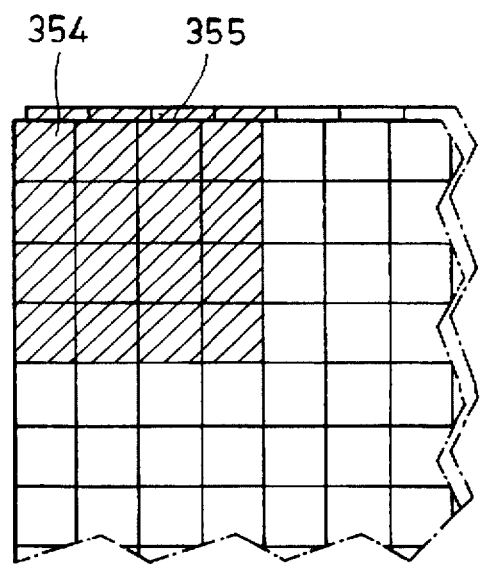

FIGS. 20(A)–20(C) illustrate the relationship of correspondence among picture elements of character/figure image data within the character IMEM 315, the photographic image data within the photograph IMEM 316 and the control data within the control memory 317.

In FIG. 20(A), reference number 351 represents one picture element of the character/figure image data (resolution of 400 dpi), and reference number 352 represents a 4×4 picture-element matrix comprising such picture elements. In FIG. 20(B), reference number 353 represents one picture element of the photographic image data (resolution of 100 dpi). In FIG. 20(C), reference number 354 represents one picture element of the control data (resolution of 400 dpi), and reference number 355 represents a 4×4 matrix comprising such picture elements of the control data. In FIGS. 20(A)–20(C), the 4×4 picture element matrix 352 of the character image data, the one picture element 353 of the photographic image data and the 4×4 matrix 355 of the control data correspond to one another.

Figure 21B:
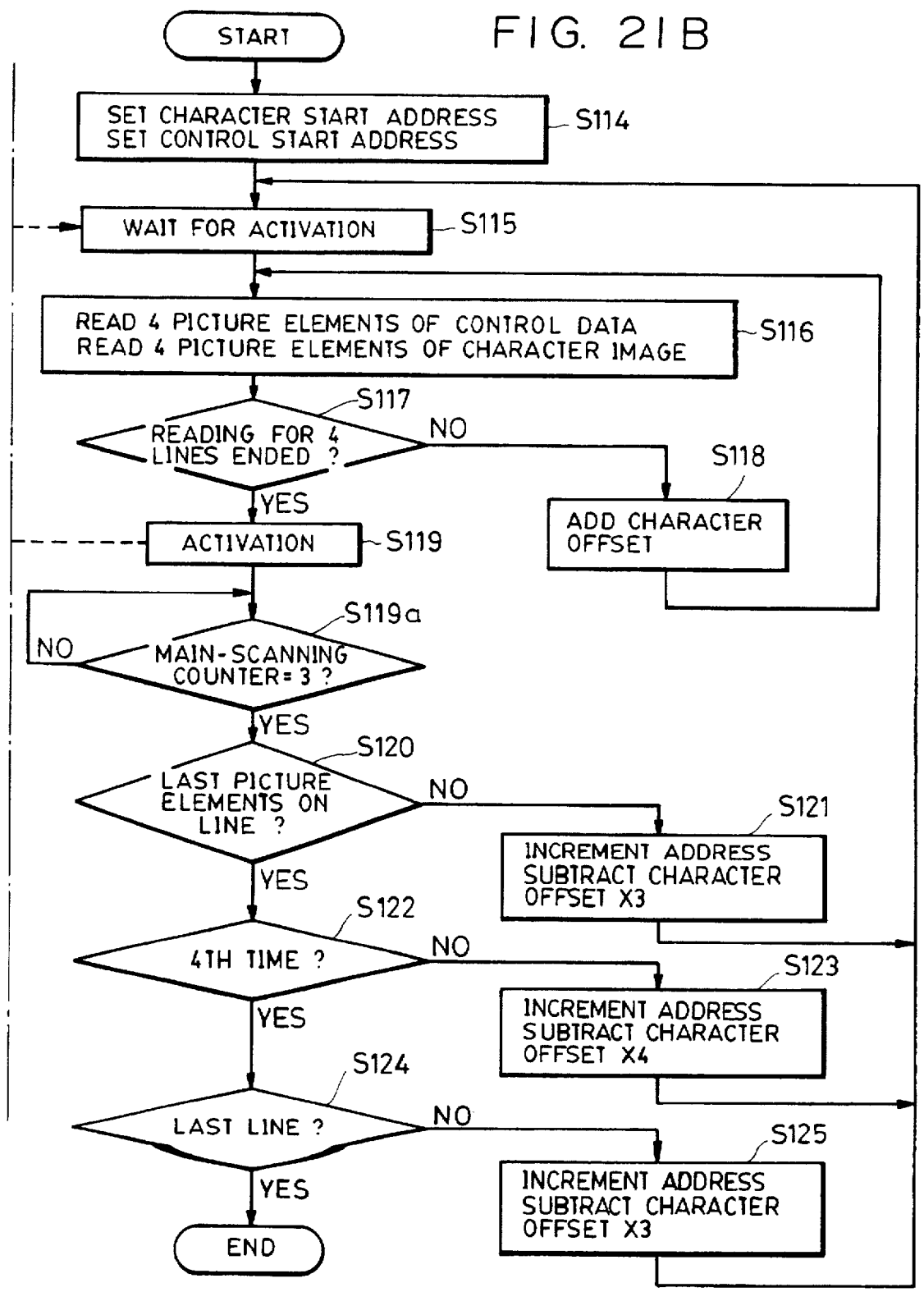
FIG. 21, composed of FIGS. 21A and 21B, is a flowchart showing a reading processing procedure for a contour assigning circuit 319 shown in FIG. 18.

Next, an explanation will be provided of the corresponding-reading operation of the character/figure image data within the character IMEM 315, the photographic image data within the photograph IMEM 316, and the control data within the control memory 317 by the read control circuit 322 with reference to a flowchart shown in FIG. 21.

FIG. 21 is a flowchart illustrating the reading operation of the read control circuit 322 for the contour assigning circuit 319. In FIG. 21, steps S101–S113 show a processing procedure for reading the photographic image data, and steps S114–S125 show a processing procedure for reading the character/figure data and the control data. The two processing procedures are synchronized by steps S106 and S115, and steps S119 and S107, so that the character/figure image data, control data and photographic image data are correspondingly read. The processing procedure will now be explained in detail.

A reading operation must start from the reference picture element start address shown in FIG. 19(B) since surrounding respective one picture elements are needed for the contour assigning circuit 319 as reference picture elements, as will be described later. At step S101, the reference picture element start, address is set in order to prepare for the reading operation. Subsequently, in a subroutine at step S102, 2×3 picture elements comprising 2 picture elements in the main-scanning direction and 3 picture elements in the subscanning direction are read, and preparation for reading photographic image data for three lines is completed. Steps S103–S105 represent a processing procedure for reading one picture element in the main-scanning direction and three picture elements in the subscanning direction. At step S103, one picture element is read. At step S104, it is determined whether or not reading for three lines has ended. If the result of this determination is negative, the process proceeds to step S105, where the photographic offset shown in FIG. 19(B) is added in order to read a picture element in the same column on the next line, and the process then returns to step S103. If the result of the determination at step S104 is affirmative, that indicates that reading for the 1×3 picture elements has ended, and the process proceeds to step S106.

By the above-described processing, 3×3 picture elements at the left end of the photographic image data have been read, and the contour assigning circuit 319 has become operable. Hence, at step S106, activation is performed for step S115, which is in a waiting state in the character/figure image data and control data reading procedure, to start reading of 4×4 picture elements.

Activation is awaited at step S107. When character/figure image data and control data for the 4×4 picture elements have been read and activation has been performed for step S107 at step S119, the process proceeds to step S107a, where the process waits until the count value in a main-scanning counter 334 becomes "3". During this period, image data of 1×4 picture elements are output from the photographic image data of the 3×3 picture elements, the character/figure image data of the 4×4 picture elements and the control data. When the output of the 1×4 picture elements has ended, the process proceeds to step S108, where it is determined whether or not the output picture element is the last picture element on the line. If the result of this determination is negative, at step S109, in order to read 1×3 picture elements for three lines on the next column, the address is incremented by one to make it to be an address in the next column. By subtracting the photograph offsets shown in FIG. 19(B) for two lines, the address is made to be an address on the leading line of the three lines of the next column, and the process then returns to step S103. If the result of the determination at step S108 is affirmative, that indicates the end of reading for one line, and the process proceeds to step S110.

As explained with reference to FIGS. 20(A)–20(C), 4×4 picture elements of character/figure image data and control data correspond to one picture element of photographic image data. Hence, identical photographic image data of 3×3 picture elements are used four times since they are referred to for image data output for four lines, but the contour assigning circuit 319 does not include line buffers for temporarily storing photographic image data in units of a line. Accordingly, the read control circuit 322 must repeat scanning processing in the main-scanning direction for reading photographic image data for the same three lines four times. At step S110, it is determined whether or not the photographic image data have been repeatedly read four times. If the result of this determination is negative, at step S111, in order to repeatedly read the photographic image data, the address is incremented to carry it to the address at the left end on the next line so as to make it to be the leading address on the line, and is returned to the leading address at the preceding reading processing by subtracting the photographic offsets for three lines. The process then returns to step S102.

If the result of the determination at step S110 is affirmative, that indicates that the reading processing has been repeated four times. Hence, the process proceeds to step S112, where it is determined whether or not the reading processing is for the last line. If the result of this determination is negative, the process proceeds to step S113. After repeating the reading processing for identical data four times, it is necessary to read data shifted by one line. Hence, at step S113, the address is incremented to carry it to the address at the left end on the next line so as to make it the leading address on the line, and is carried to the position of the leading address on the line shifted by one line from the preceding processing by subtracting the photographic offsets for two lines. The process then returns to step S102. If the result of the determination at step S112 is affirmative, the process is ended.

An explanation has been provided of a reading procedure of photographic image data. An explanation will now be provided of a reading procedure for character/figure image data and control data. Since identical steps are used for the two data, an explanation will be provided of the procedure for character/figure image data.

At step S114, the character start address (the control start address) is set to prepare for a reading operation. At step S115, activation from the photographic image data reading side is awaited. When activation has been performed, the process proceeds to step S116. In processing procedure at steps S116–S118, a reading operation of a 4×4 picture element matrix comprising 4 picture elements in the main-scanning direction and 4 picture elements in the subscanning direction is performed. When the reading operation has ended, activation is performed for the photographic image reading side at step S119, and the process proceeds to step S119a, where the process waits until the count value of the main-scanning counter 334 becomes "3" as in the above-described step S107a. This is for waiting for the end of image data output of ×4 picture elements as described above.

When the output of the 1×4 picture element has ended, the process proceeds to step S120. A process procedure at steps S120–S125 corresponds to steps S108–S113 for the photographic image data reading operation, and the same processing is performed except that the subtraction of the character offsets for one more lines is performed since the character/figure image data and control data side has units of four lines. At steps S120 and S121, reading processing of one picture element in units of four lines in the main-scanning direction is performed. At steps S122 and S123, the above-described scanning processing in the main-scanning direction is repeated four times. At steps S124 and S125, the above-described processing is performed until the last line, and the processing procedure is ended.

A processing procedure of a subroutine for reading 2×3 picture elements at step S102 shown in FIG. 21 is identical to the flowchart shown in FIG. 8 except that the color offset at steps S33 and S35 is replaced by the photographic offset.

(Synthesis of Two Kinds of Photographic Images)

Figure 22:
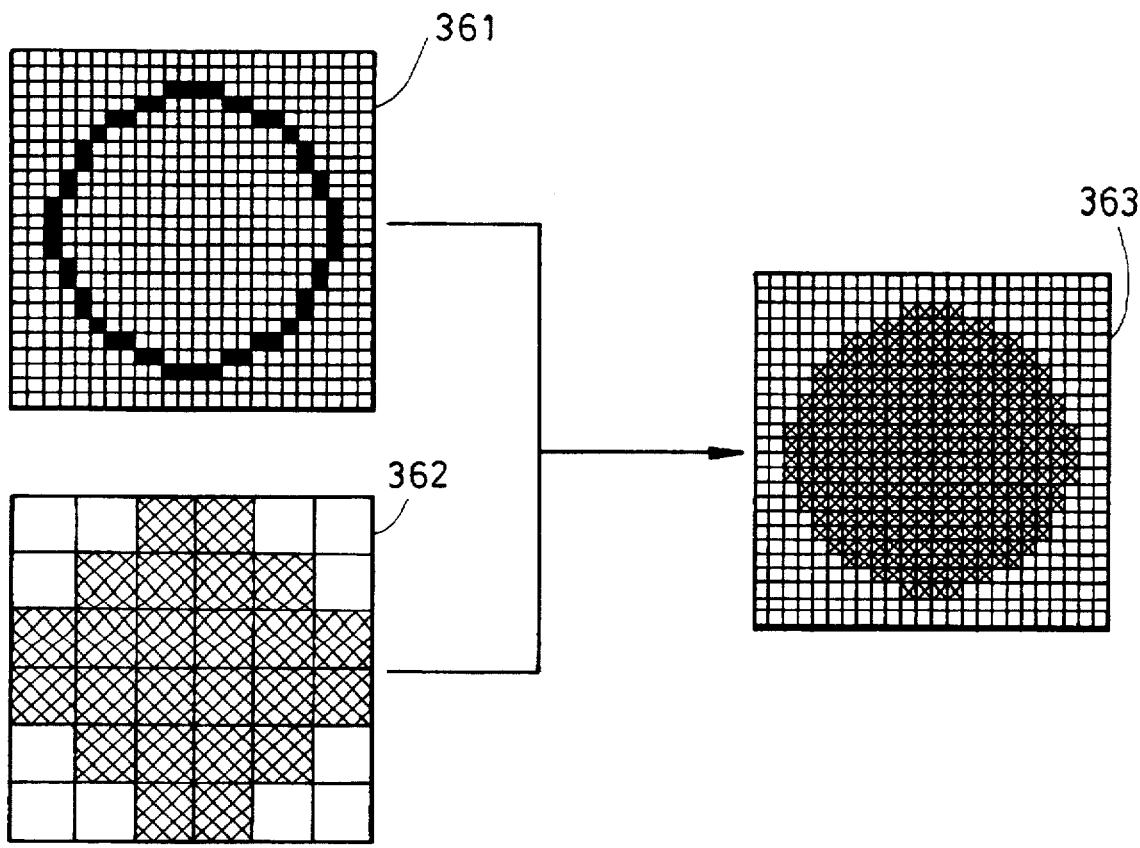
FIG. 22 shows an example of contour assigning processing.

Next, a detailed explanation will be provided of the operation of the contour assigning circuit 319 shown in FIG. 2 with reference to FIGS. 10(A)–10(T) and 22.

An explanation will be provided of FIG. 2 in the present embodiment. First control data are stored in a 4×4 picture element matrix constituted by FFs 32a–32p, and photographic image data corresponding to the 4×4 picture element matrix are stored in a 24-bit FF 36e. When assigning a contour, since reference picture elements are needed, photographic image data for the surrounding 8 picture elements are stored in 24-bit FFs 36a–36d, 36f–36g, and constitute a 3×3 picture element matrix together with the 24-bit FF 36e. First control data read by the read control circuit 322 are stored in SRs 31a–31d in units of a 4×4 picture element matrix. When the processing of the 4×4 picture element matrix constituted by the FFs 32a–32p has been completed, the next data are transferred from the SRs 31a–31d to the FFs 32a–32b.

Table information for addressing the pattern of the 4×4 picture element, matrix and the count values of a main scanning counter 34 and a subscanning counter 35 to output a selection signal for a selector 37 is stored in a contour assigning table ROM 33. Which picture element within a 3×3 picture element matrix of the photographic image data is to be selected is determined for every picture element of image data output. Image information selected by the selector 37 is output as 24-bit image data. That is, image data for 1×4 picture elements are output from photographic image data for the 3×3 picture elements and first control data for the 4×4 picture elements. Accordingly, by performing one scanning of the image data, image data output for one line is obtained, and by repeating the scanning four times, image data output for four lines is performed.

Examples of contour assigning processing are identical to those shown in FIGS. 10(A)–10(T). In the present embodiment, the 4×4 picture element matrix is made to be the first control data, and the 3×3 picture element matrix is made to be the photographic image data.

FIG. 22 shows an example of contour assigning processsing of the present embodiment. In FIG. 22, reference number 361 represents an example of contour assignment by the first control data. Reference number 362 represents an example wherein two kinds of photographic images are synthesized. Reference number 363 represents a result of contour assigning processing. As is apparent from FIG. 22, by performing contour processing for photographic image data having a resolution of 100 dpi, two kinds of photographic images can be synthesized with a resolution of 400 dpi.

(Synthesis of Character/Figure and Photograph)

Figure 23:
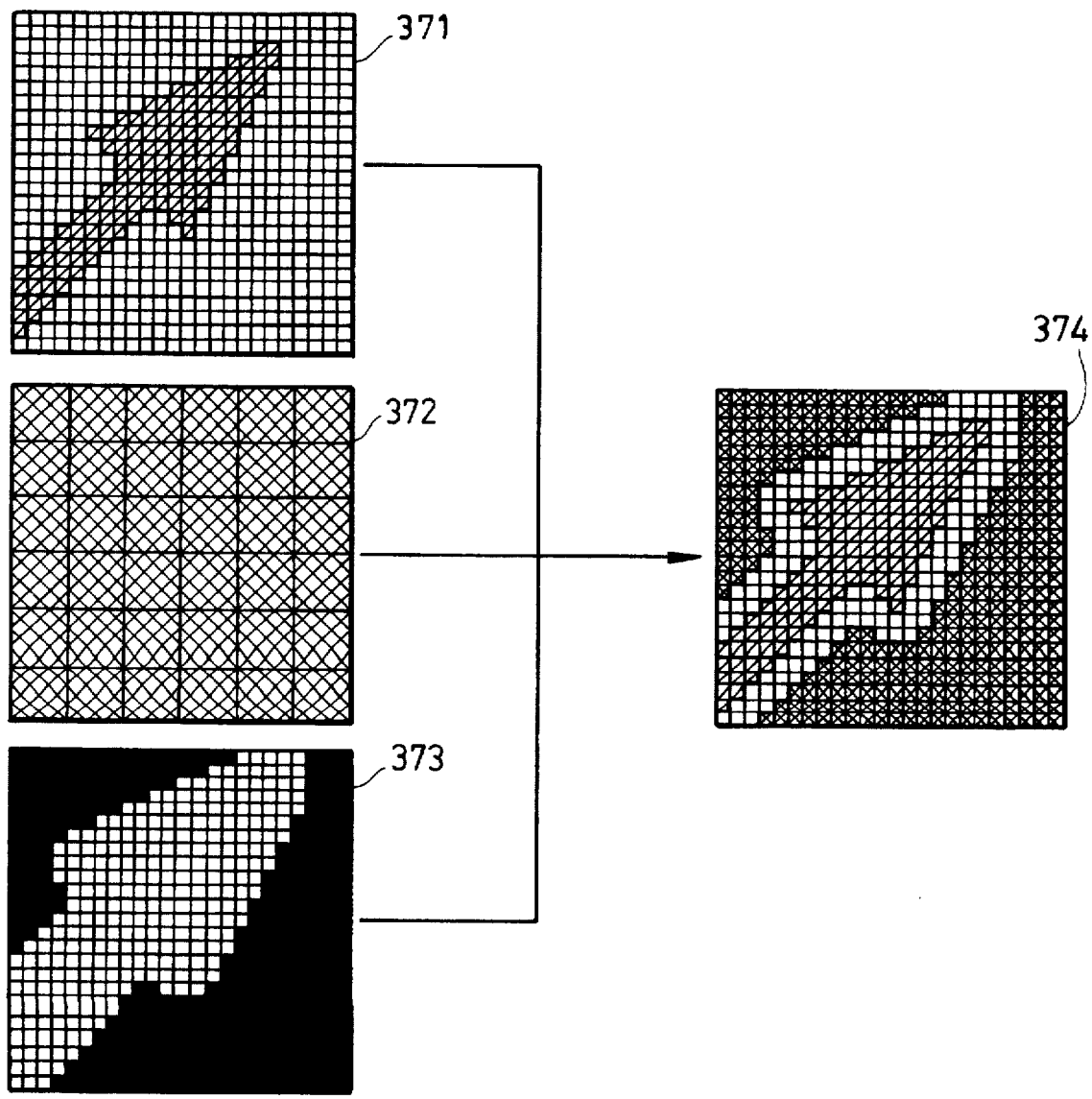
FIG. 23 illustrates an operation to selectively output character/figure image data and photographic image data.

Next, with reference to FIG. 23, an explanation will be provided of the operation of the selector 321 to selectively output character/figure image data and photographic image data according to the second control data within the control memory 317 shown in FIG. 18. FIG. 23 illustrates specific processing to provide a leader having an arrow for notes within a photographic image B shown in FIG. 24.

In FIG. 23, reference number 371 represents an example of an arrow of character/figure image data (resolution of 400 dpi). Reference number 372 represents an example of a photographic image of photographic image data (resolution of 100 dpi). Reference number 373 is an example of the assignment of synthesis for synthesizing the above-described two kinds of data by the second control data. Black portions in the example 373 indicate photographic image regions, and a white portion indicates a character/figure image region. The selector 321 selectively outputs the example 371 of the arrow and the example 372 of the photographic image according to the example 373 of the assignment of synthesis, and outputs synthesized image data 374. In the example shown in FIG. 23, in synthesizing the arrow within the photographic image, a white frame is provided in order to increase the discriminating property of the arrow. It can be seen that the synthesis is performed with a resolution of 400 dpi.

(Example of Printing Output)

Figure 24:
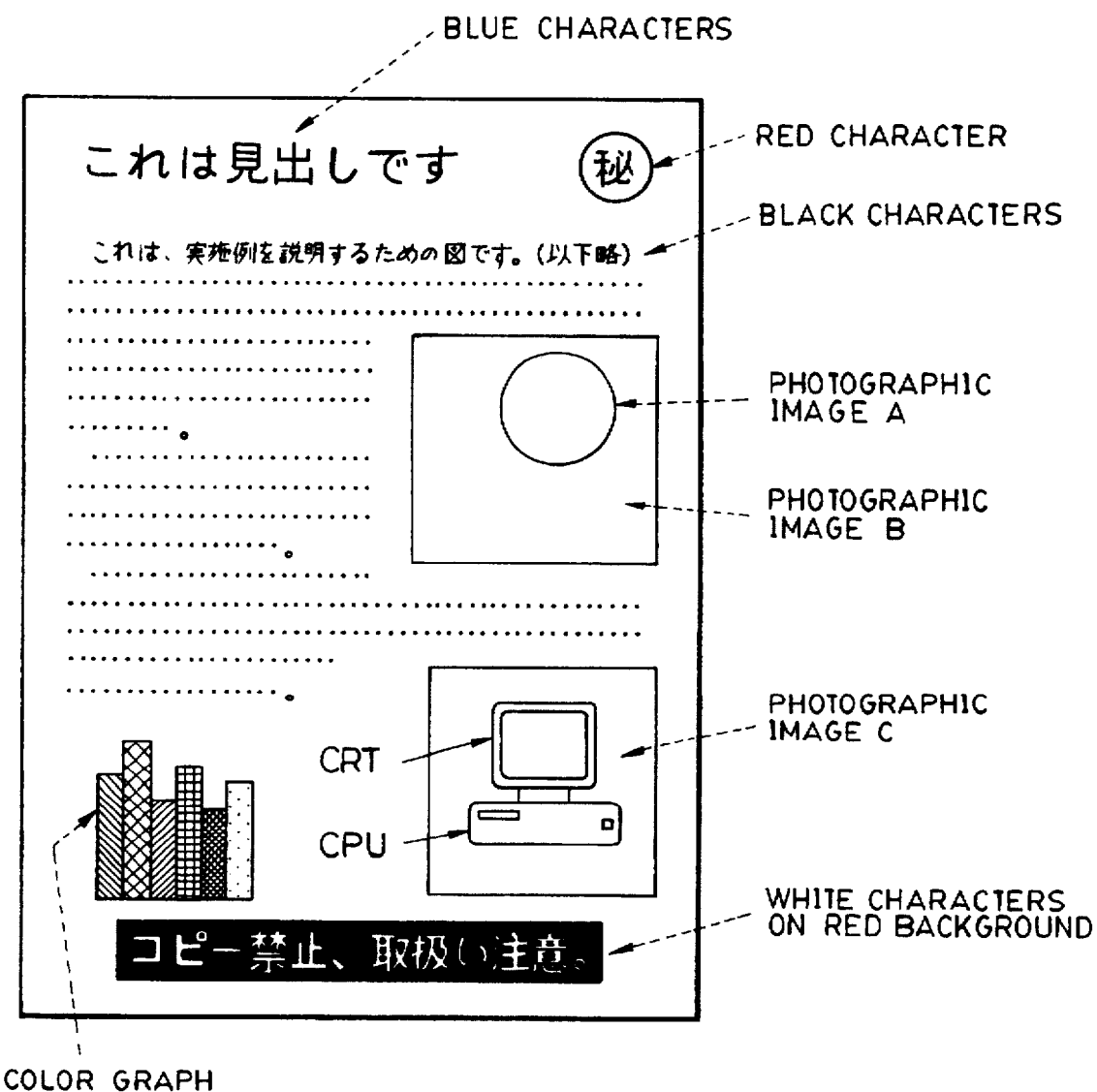
FIG. 24 shows an example of printing output obtained according to the second embodiment.

Finally, with reference to FIGS. 24–26, an explanation will be provided of the operation to obtain a printing output by the image control unit 13 shown in FIG. 18.

FIG. 24 shows an example of printing output, which comprises blue characters in caption, black characters in the text, a red character, and white characters on red background in notes, a photographic image obtained by synthesizing a photographic image A and a photographic image B, an image obtained by synthesizing a leader having an arrow and notes in a photographic image C, and a color graph. The portion where the photographic image A is synthesized in the photographic image B uses contour assignment by the first control data. The portion where the leader having the arrow is synthesized in the photographic image C uses image synthesis by the second control data. Other portions are formed by character/figure data.

FIGS. 25(A), 25(B), 26(A) and 26(B) show examples of setting for obtaining the printing example shown in FIG. 24.

Figure 25A:
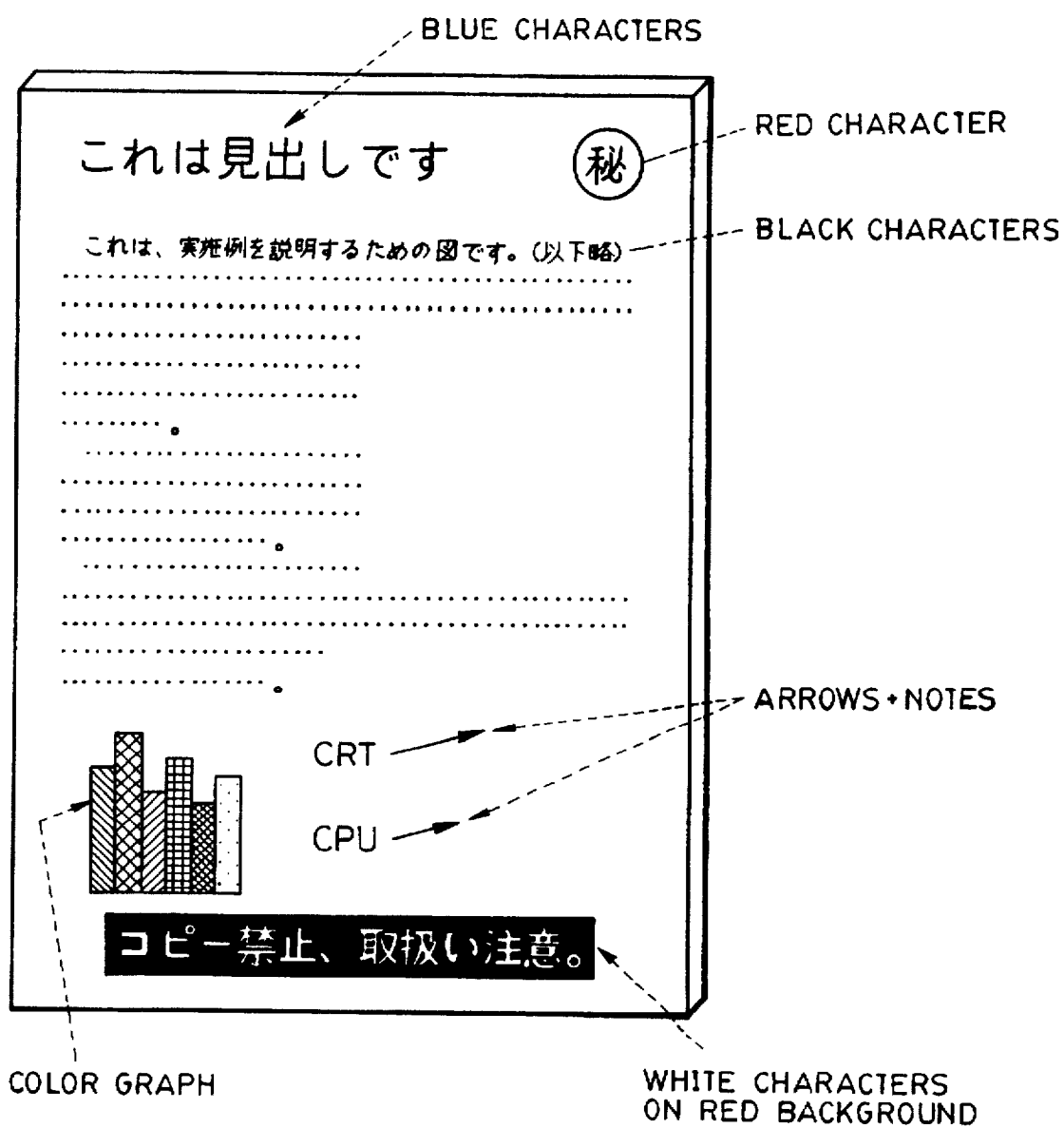
FIGS. 25(A), 25(B), 26(A) and 26(B) show examples of setting for obtaining the example of printing output shown in FIG. 24.
Figure 25B:
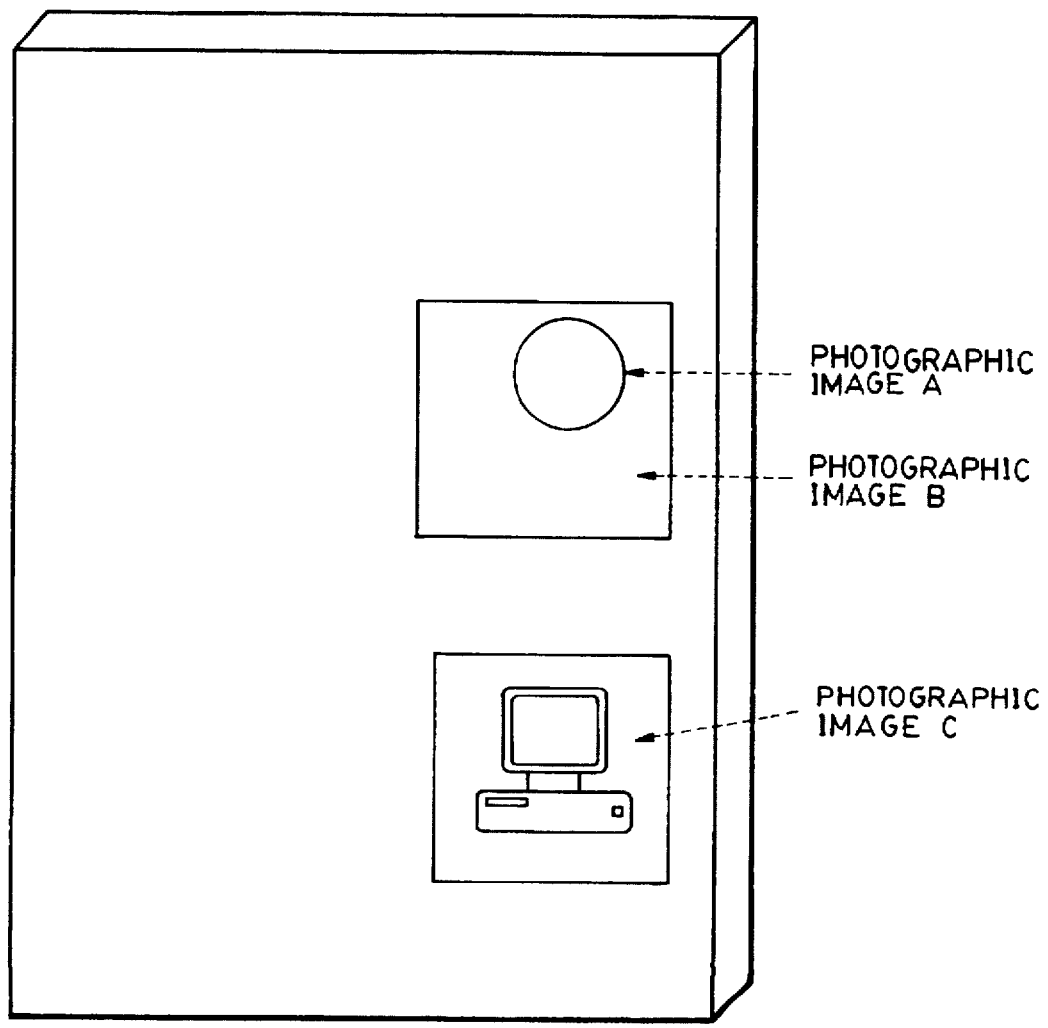
Figure 26A:
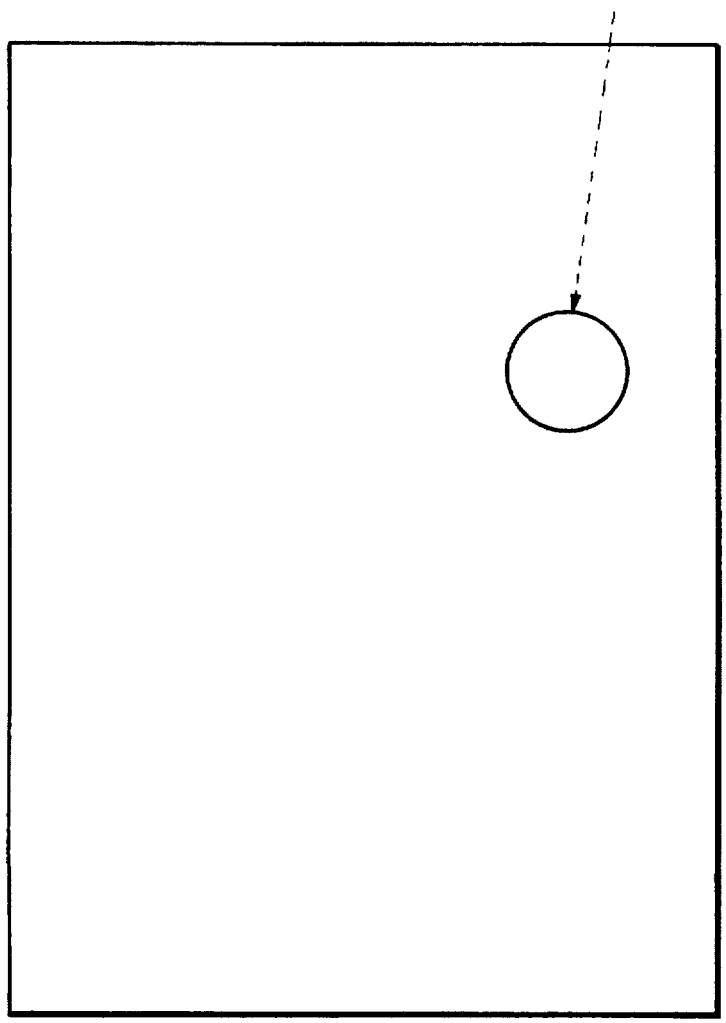
Figure 26B:
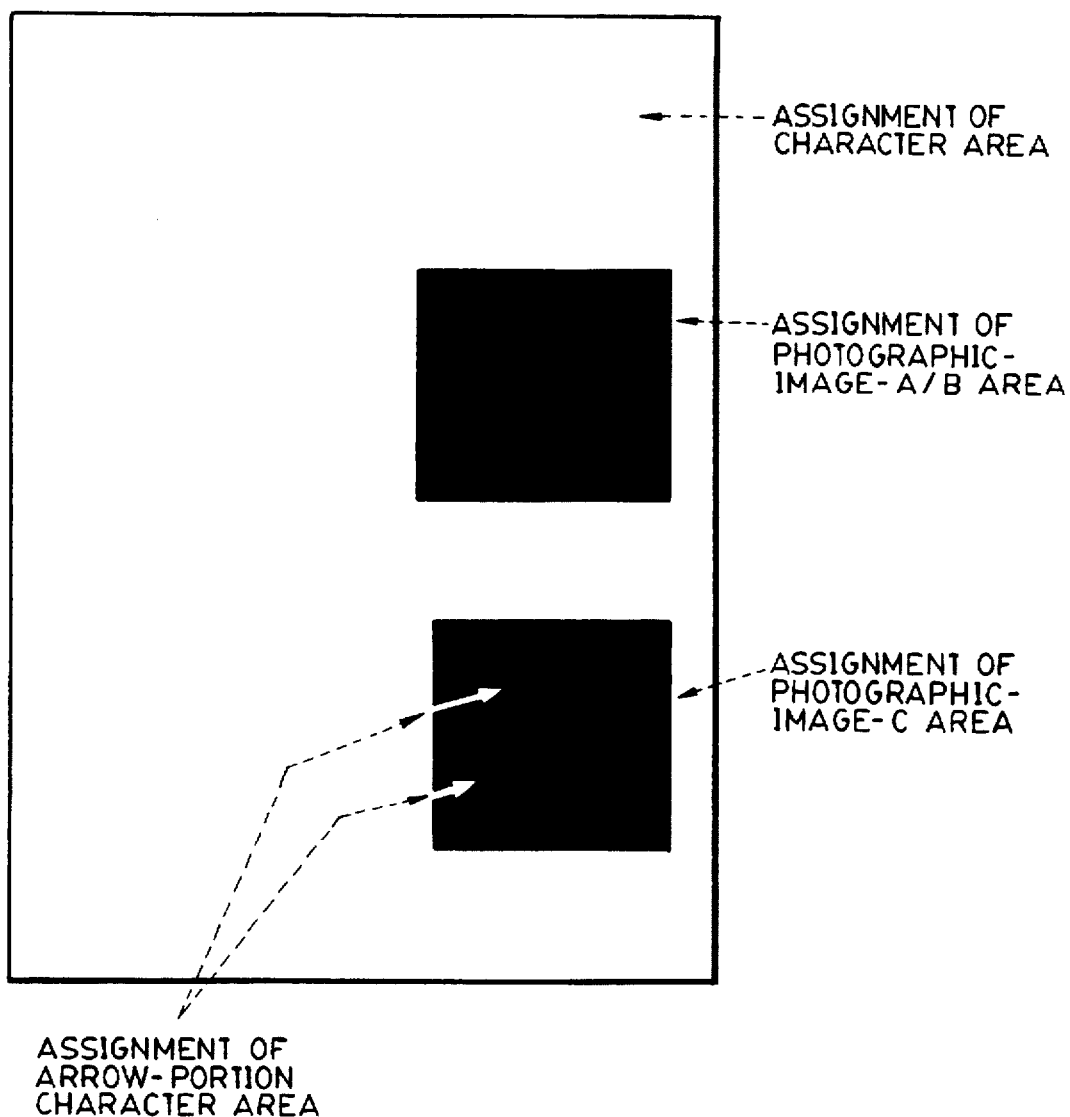
Figure 27:
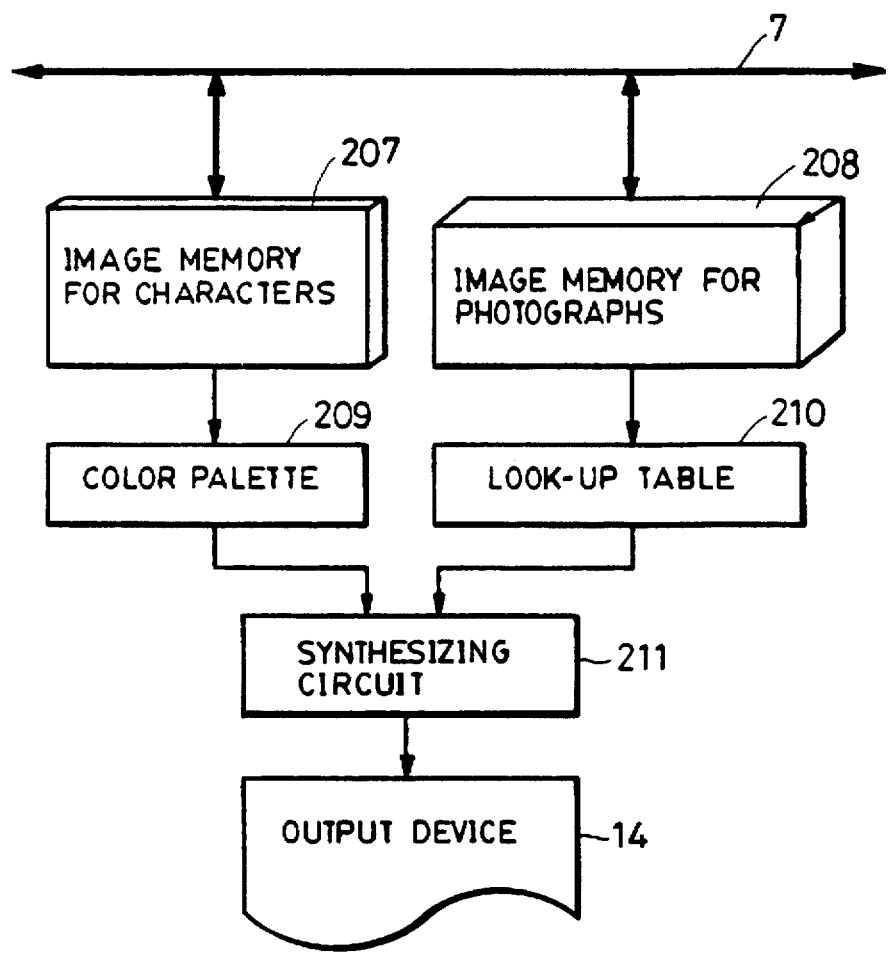
FIG. 27 shows an example of the configuration of a conventional image control unit.

FIG. 25(A) shows an example of setting the character/figure image data in the character IMEM 315. Basically, all the character/figure information is set. FIG. 25(B) shows an example of setting the photographic image data within the photography IMEM 316. The photographic image A is synthesized in the photographic image B with a resolution of 100 dpi. FIG. 26(A) shows an example of setting the first control data in the control memory 317, and shows an example of setting contour assignment for the photographic image A. FIG. 26(B) shows an example of setting the second control data in the control memory 317. White portions indicate regions for character/figure images. Black portions indicate regions for photographic images. In a portion where arrows are synthesized in the photographic image C, arrow portions are assigned to be regions for character/figure images. By setting the data as described above, the printing example shown in FIG. 24 can be obtained.

In the present embodiment, since line buffers are not provided within the contour assigning circuit 319, the read control circuit 322 performs a control to read identical data a plurality of times. However, line buffers may be provided within the contour assigning circuit to reduce the number of reading operations and to simplify the configuration of the read control circuit 322.

Various other changes and modifications may be made without departing from the true spirit and scope of the present invention.

According to the present invention, it is possible to provide an image processing apparatus which processes a color image obtained by synthesizing a photograph and another photograph, or a photograph and characters with a small memory capacity, and Outputs an image having a high quality.

That is, it is possible to provide an image processing apparatus which comprises a memory for storing character/ figure images having a high resolution and a small amount of information per picture element, a memory for storing photographic images having a low resolution and a large amount of information per picture element, and a memory for storing control data for controlling the above-described two kinds of images, and in which an image output having a high picture quality can be obtained with a small amount of information by effectively utilizing features of the above-described two kinds of images. It is thereby possible to reduce the number of devices for storing information, and therefore to reduce cost. It is also possible to minimize deterioration in picture quality caused by reducing the amount of information.

What is claimed is:

1. An image data processing apparatus comprising:

first storage means for storing image data as contour data of a first resolution;

second storage means for storing the image data as color data of a resolution lower than the first resolution, the color data corresponding to a plurality of the contour data;

reading out means for reading a first number of data which are adjacent to each other of the contour data stored in said first storage means and a second number of data which are adjacent to each other of the color data including the color data corresponding to the plurality of the contour data stored in said second storage means;

selection means for selecting one color data from among the read second number of the color data at the position of each of the read first number of the contour data; and generating means for generating a value of an area surrounded by the contour data by repeating reading out of data by said reading out means and selection of data by said selection means.

2. An image data processing apparatus according to claim 1, wherein the contour data comprises picture element data in which one picture element corresponds to one bit, and wherein the color data comprises picture element data in which one picture element corresponds to a plurality of bits.

3. An image data processing apparatus according to claim 2, further comprising an output device which outputs the image generated by said generation means.

4. An image data processing apparatus according to claim 3, wherein said output device outputs the image at a resolution which is the same as the first resolution.

5. An image data processing apparatus according to claim 1, further comprising an output device which outputs the image generated by said generation means.

6. An image data processing apparatus according to claim 5, wherein said output device outputs the image at a resolution which is the same as the first resolution.

7. An image data processing method comprising the steps of:

storing image data as contour data of a first resolution in a first storage means;

storing the image data as color data of a resolution lower than the first resolution in a second storage means, the color data corresponding to a plurality of the contour data;

reading a first number of data which are adjacent to each other of the contour data stored in said first storage means and a second number of data which are adjacent to each other of the color data including the color data corresponding to the plurality of the contour data stored in said second storage means; and selecting one color data from among the read second number of the color data at the position of each of the read first number of the contour data, wherein a value of an area surrounded by the contour data is generated by repeating said reading step and said selecting step.

8. An image data processing method according to claim 7, wherein the contour data comprises picture element data in which one picture element corresponds to one bit, and wherein the color data comprises picture element data in which one picture element corresponds to a plurality of bits.

9. An image data processing method according to claim 7, further comprising the step in which the image generated in said generation step is output to an output means.

10. An image data processing method according to claim 9, wherein the image output in said output step has the same resolution as the first resolution.

* * * * *

UNITED STATES PATENT AND TRADEMARK OFFICE
CERTIFICATE OF CORRECTION

PATENT NO. : 5,781,666

DATED : July 14, 1998

INVENTOR(S) : YASUHISA ISHIZAWA ET AL.

It is certified that error appears in the above-identified patent and that said Letters Patent is hereby corrected as shown below:

COLUMN 8 line 35, "the the" should read --the--.

COLUMN 9 line 36, "step S10," should read --step S11,--.

COLUMN 13 line 11, "Y1E" should read --$Y_{1E}$--;
line 22, "AND" should read --ANDs--; and
line 53, "+background" should read --+ background--.

UNITED STATES PATENT AND TRADEMARK OFFICE
CERTIFICATE OF CORRECTION

PATENT NO. : 5,781,666

DATED : July 14, 1998

INVENTOR(S): YASUHISA ISHIZAWA ET AL.

It is certified that error appears in the above-identified patent and that said Letters Patent is hereby corrected as shown below:

COLUMN 18 line 55,   "of X4" should read --of 1x4--.

COLUMN 20 line 64,   "Outputs" should read --outputs--.

Signed and Sealed this

Twenty-ninth Day of June, 1999

Attest:

Q. TODD DICKINSON

*Attesting Officer*     *Acting Commissioner of Patents and Trademarks*